United States Patent
Ko et al.

(10) Patent No.: US 11,950,193 B2
(45) Date of Patent: Apr. 2, 2024

(54) METHOD AND DEVICE FOR TRANSMITTING S-SSB IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 17/594,764

(22) PCT Filed: May 11, 2020

(86) PCT No.: PCT/KR2020/006143
§ 371 (c)(1),
(2) Date: Oct. 28, 2021

(87) PCT Pub. No.: WO2020/226464
PCT Pub. Date: Nov. 12, 2020

(65) Prior Publication Data
US 2022/0201629 A1    Jun. 23, 2022

Related U.S. Application Data

(60) Provisional application No. 62/891,174, filed on Aug. 23, 2019, provisional application No. 62/845,943, filed on May 10, 2019.

(30) Foreign Application Priority Data

May 9, 2019   (KR) .......................... 10-2019-0054464

(51) Int. Cl.
*H04W 56/00*   (2009.01)
*H04W 4/40*    (2018.01)

(52) U.S. Cl.
CPC ............. *H04W 56/00* (2013.01); *H04W 4/40* (2018.02)

(58) Field of Classification Search
CPC ..... H04W 56/00; H04W 4/40; H04W 56/001; H04J 13/00; H04J 11/00; H04J 11/0073; H04J 11/0076; H04J 13/0007; H04J 13/0025; H04J 13/0074; H04L 1/08;
(Continued)

(56) References Cited

U.S. PATENT DOCUMENTS

| 2018/0198659 A1 | 7/2018 | Ko et al. | |
| 2019/0028244 A1* | 1/2019 | Si | H04W 72/23 |
| 2020/0266857 A1* | 8/2020 | Hwang | H04W 72/23 |

(Continued)

OTHER PUBLICATIONS

PCT International Application No. PCT/KR2020/006143, International Search Report dated Aug. 20, 2020, 4 pages.
(Continued)

*Primary Examiner* — Abdullahi Ahmed
(74) *Attorney, Agent, or Firm* — LEE, HONG, DEGERMAN, KANG & WAIMEY

(57) ABSTRACT

An operating method of a first device (100) in a wireless communication system is presented. The method can comprise the steps of receiving an SL SSB from a second device, and acquiring bit information on the basis of the order in which a first m-sequence and a second m-sequence are mapped to a first PSS symbol and a second PSS symbol.

15 Claims, 27 Drawing Sheets

(58) Field of Classification Search
CPC ....... H04L 5/00; H04L 5/0048; H04L 1/0009; H04L 5/0053
See application file for complete search history.

(56) References Cited

U.S. PATENT DOCUMENTS

| | | | |
|---|---|---|---|
| 2020/0359375 A1* | 11/2020 | Hwang | H04L 1/1854 |
| 2021/0120383 A1* | 4/2021 | Park | H04L 43/0876 |
| 2022/0116895 A1* | 4/2022 | Ko | H04W 4/40 |
| 2022/0191847 A1* | 6/2022 | Hong | H04W 72/20 |
| 2022/0201630 A1* | 6/2022 | Ko | H04W 4/40 |

OTHER PUBLICATIONS

Huawei et al., "Sidelink synchronization mechanisms for NR V2X," 3GPP TSG RAN WG1 Meeting #97, R1-1906012, May 2019, 13 pages.

Nokia et al., "Discussion on NR V2X Sidlelink Synchronization mechanism," 3GPP TSG-RAN WG1 #97, R1-1906077, May 2019, 10 pages.

Vivo, "Sidelink synchronization mechanism," 3GPP TSG RAN WG1 #97, R1-1906140, May 2019, 11 pages.

LG Electronics, "Discussion on NR sidelink synchronization mechanism," 3GPP TSG RAN WG1 #96bis Meeting, R1-1905441, Apr. 2019, 21 page.

* cited by examiner (a)

(b)

(a)

(b)

FIG. 21 transmitting an SL SSB to a first apparatus — S2110

METHOD AND DEVICE FOR TRANSMITTING S-SSB IN NR V2X

CROSS-REFERENCE TO RELATED APPLICATIONS

This application is the National Stage filing under 35 U.S.C. 371 of International Application No. PCT/KR2020/006143, filed on May 11, 2020, which claims the benefit of earlier filing date and right of priority to Korean Patent Application No. 10-2019-0054464, filed on May 9, 2019, and also claims the benefit of U.S. Provisional Application No. 62/845,943, filed on May 10, 2019, and 62/891,174, filed on Aug. 23, 2019, the contents of which are all incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

In an embodiment, a method of operating a first apparatus 100 in a wireless communication system is proposed. The method includes: receiving an SL SSB from a second apparatus; and obtaining bit information based on an order in which a first m-sequence and a second m-sequence are mapped to a first PSS symbol and a second PSS symbol.

Effects of the Disclosure

The user equipment (UE) may efficiently perform SL communication.

BRIEF DESCRIPTION OF THE DRAWINGS

FIG. 21 shows a procedure in which a second apparatus transmits an SL SSB to a first apparatus, according to an embodiment of the present disclosure.

DESCRIPTION OF EXEMPLARY EMBODIMENTS

Figure 1:
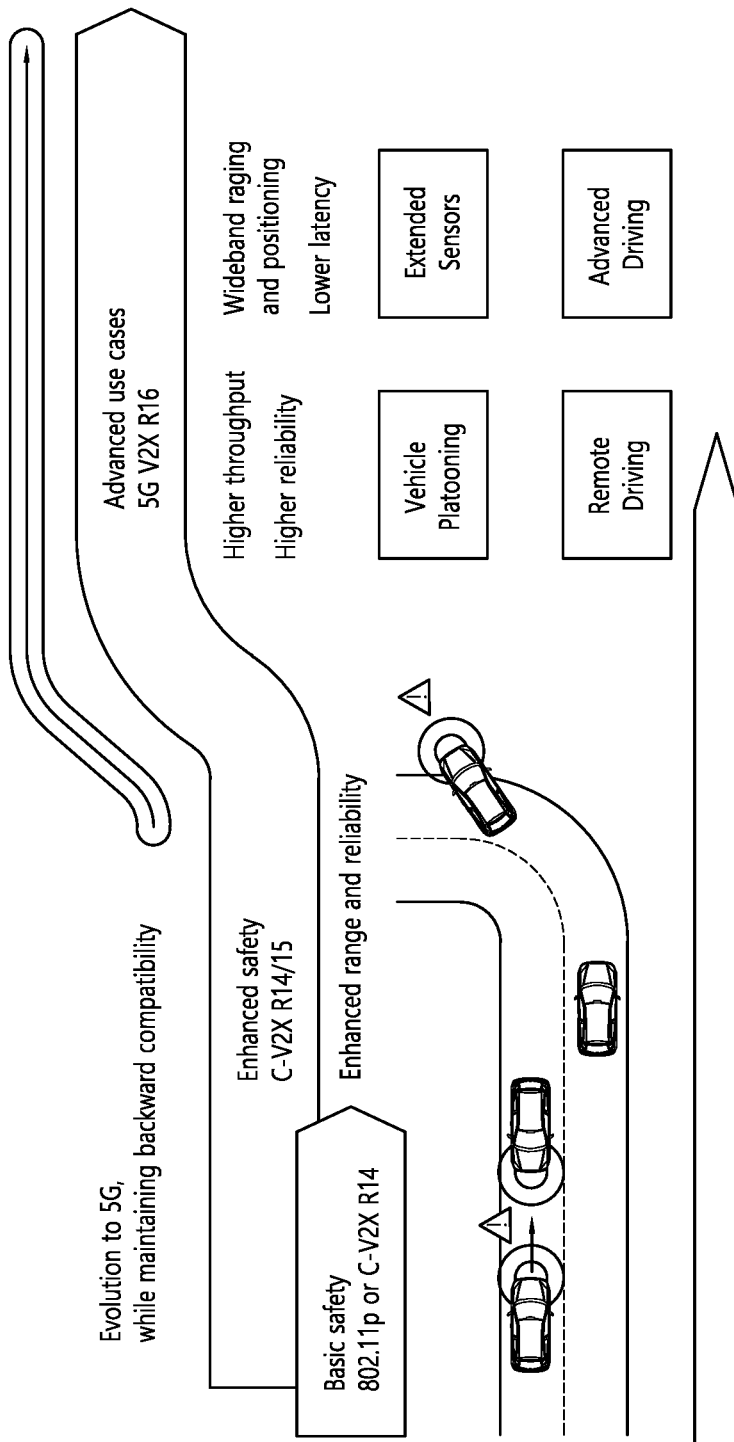
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
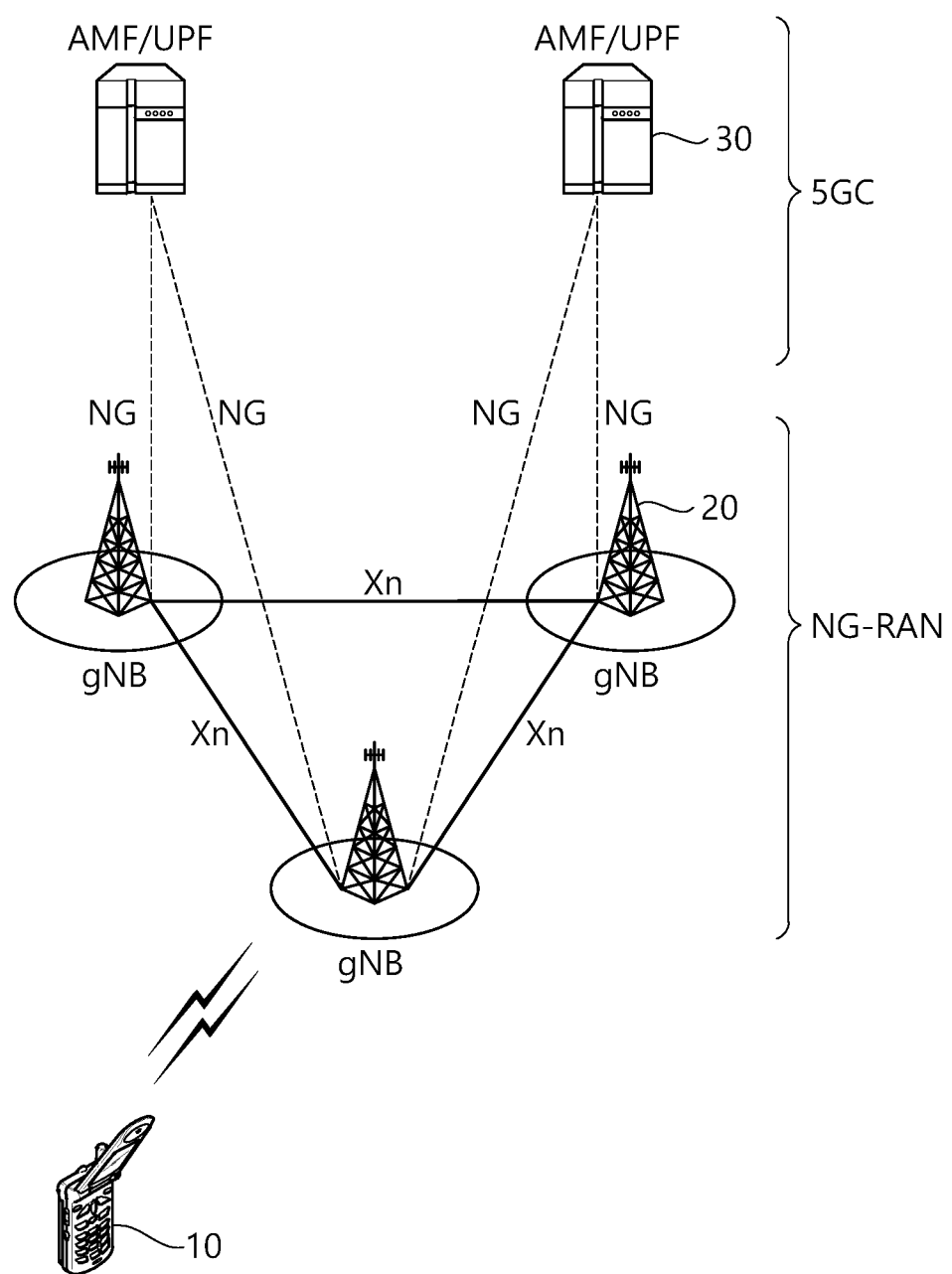
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
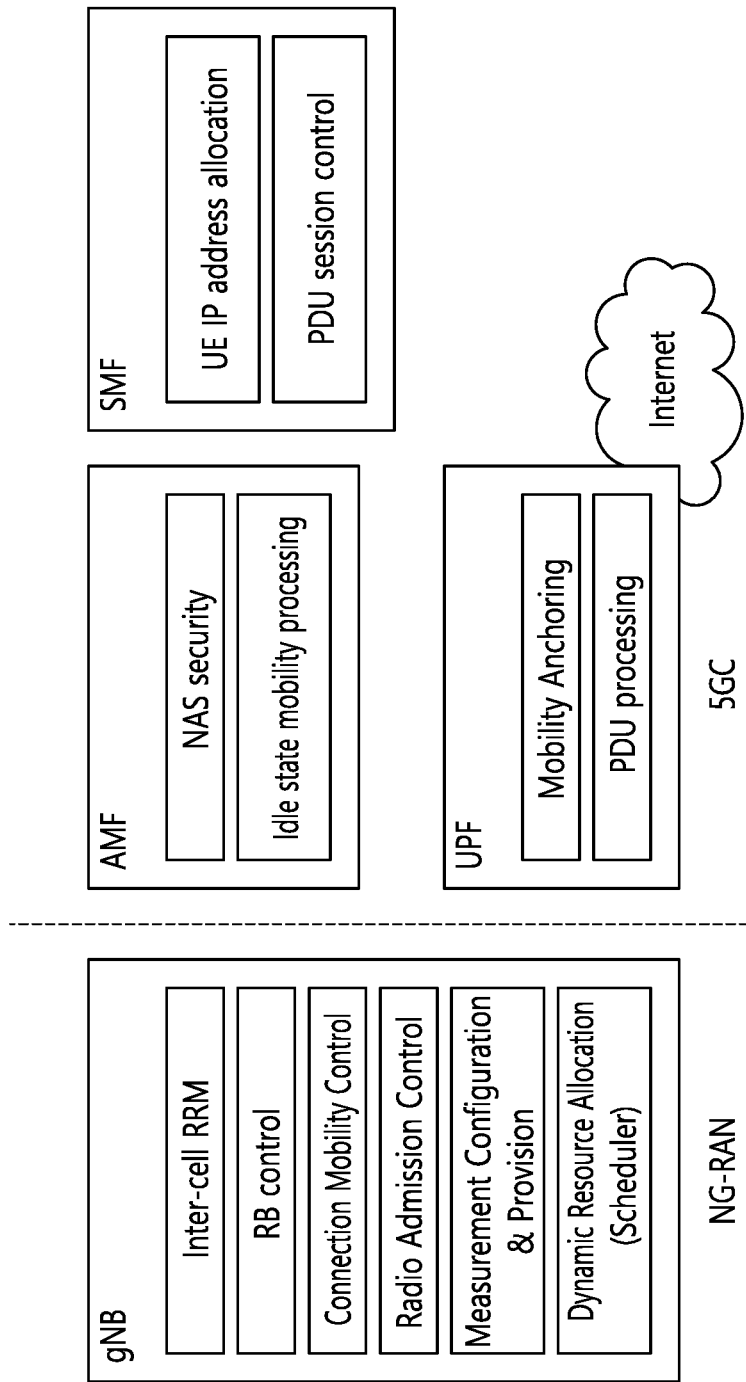
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
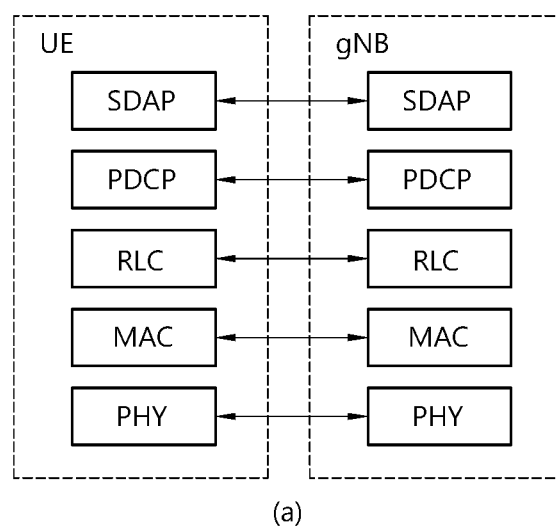
FIG. 4 shows a radio protocol architecture, in accordance with an embodiment of the present disclosure.
Figure 4:
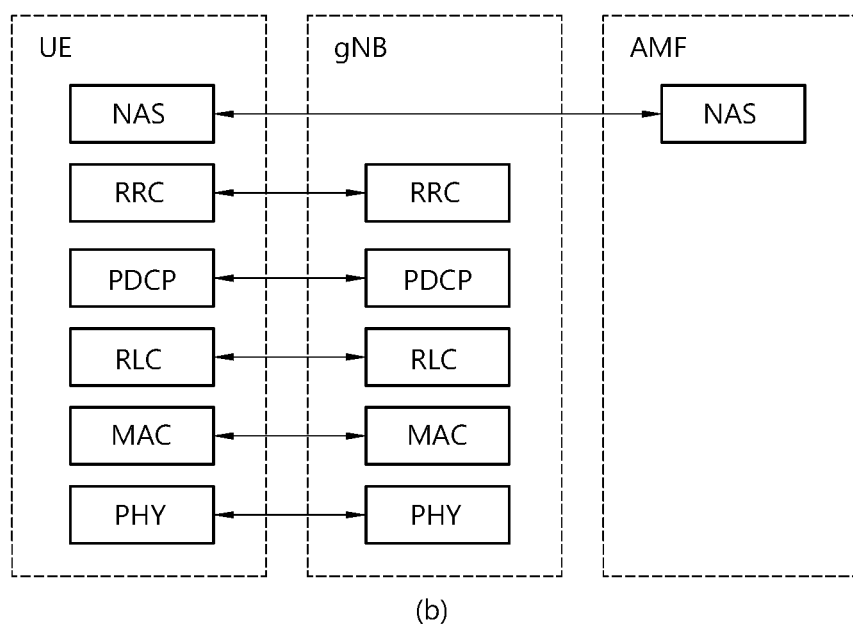

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
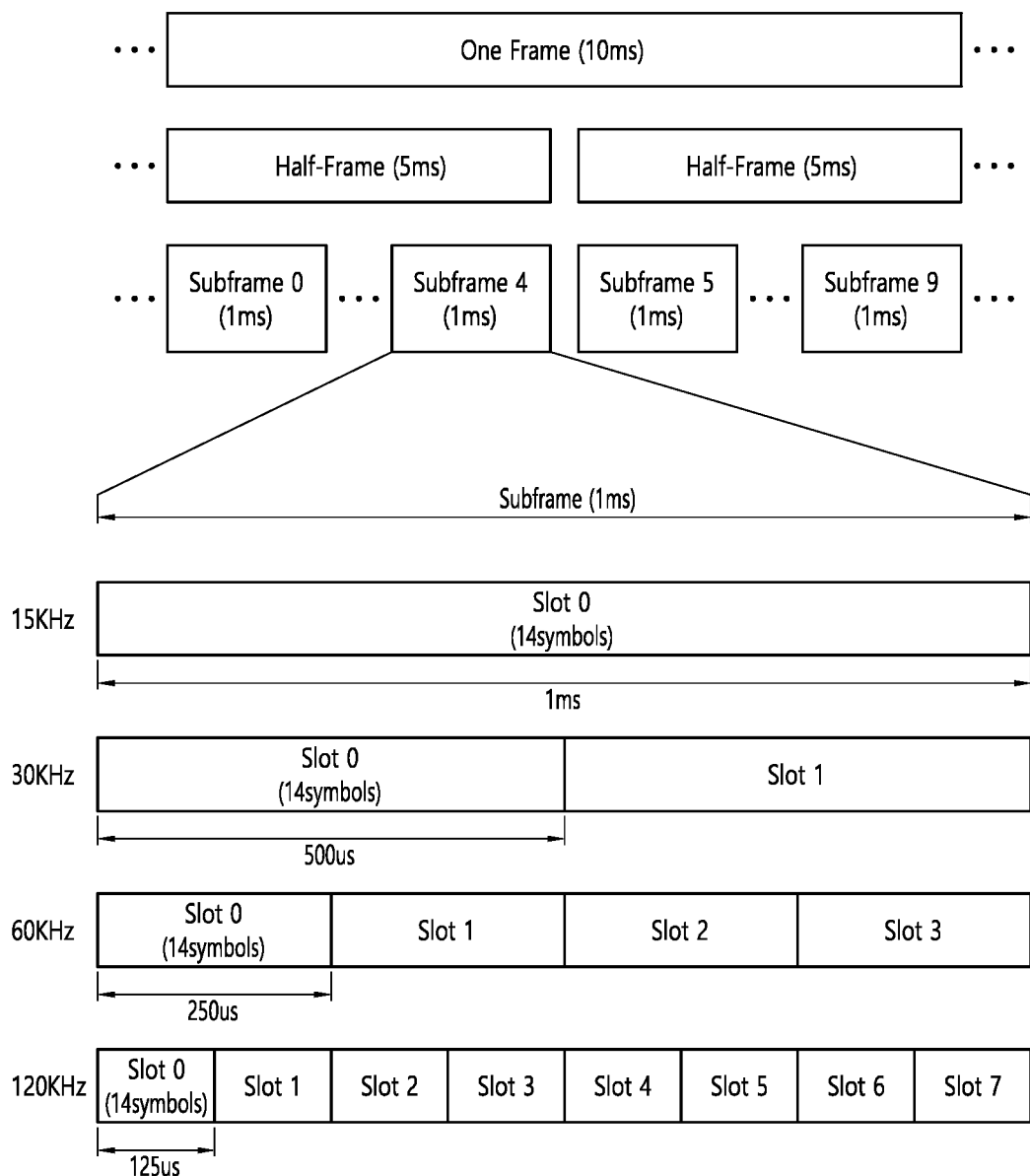
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |

TABLE 1-continued

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
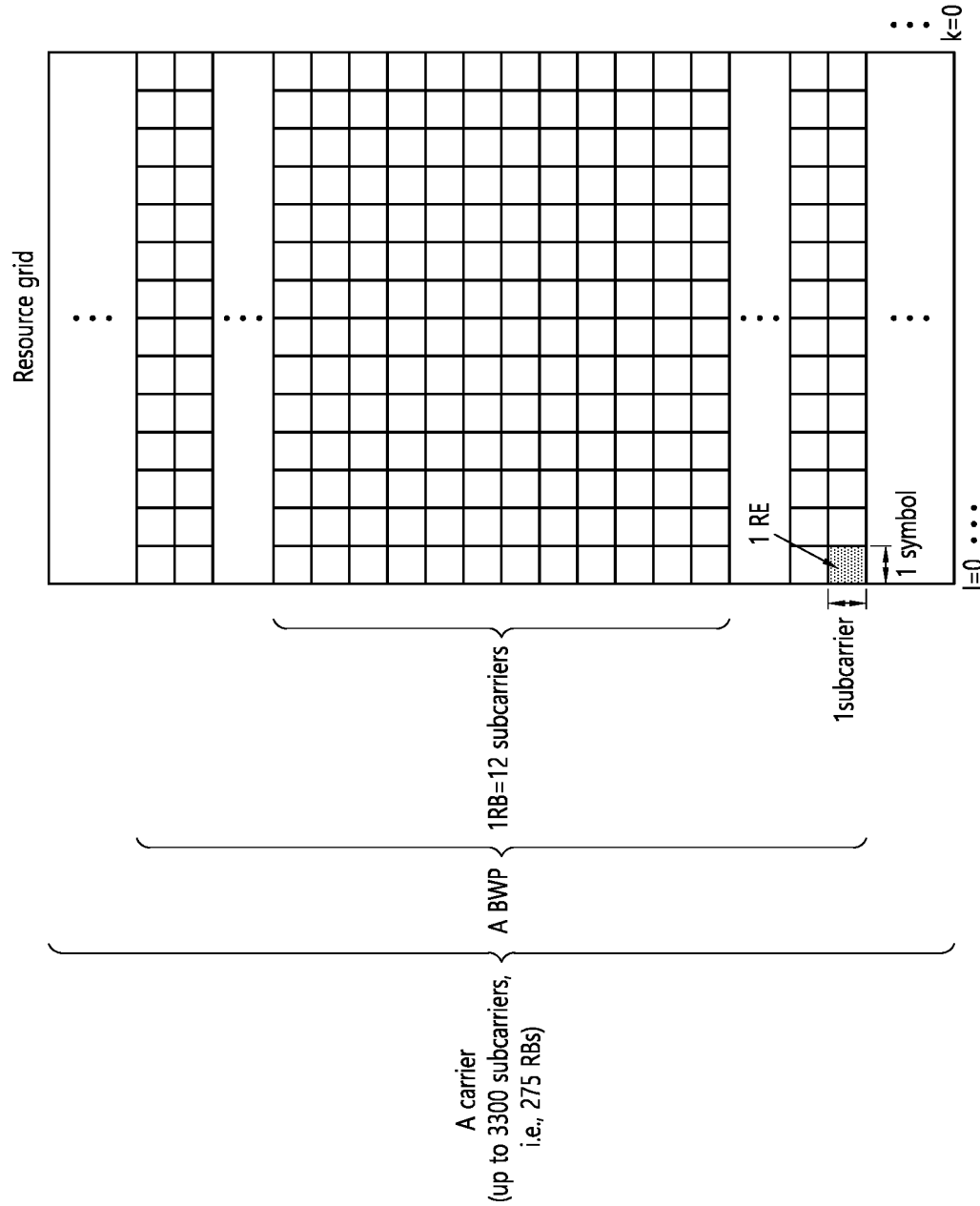
FIG. 6 shows a structure of a slot of an NR frame, in accordance with an embodiment of the present disclosure.

FIG. 6 shows a structure of a slot of an NR frame, in accordance with an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
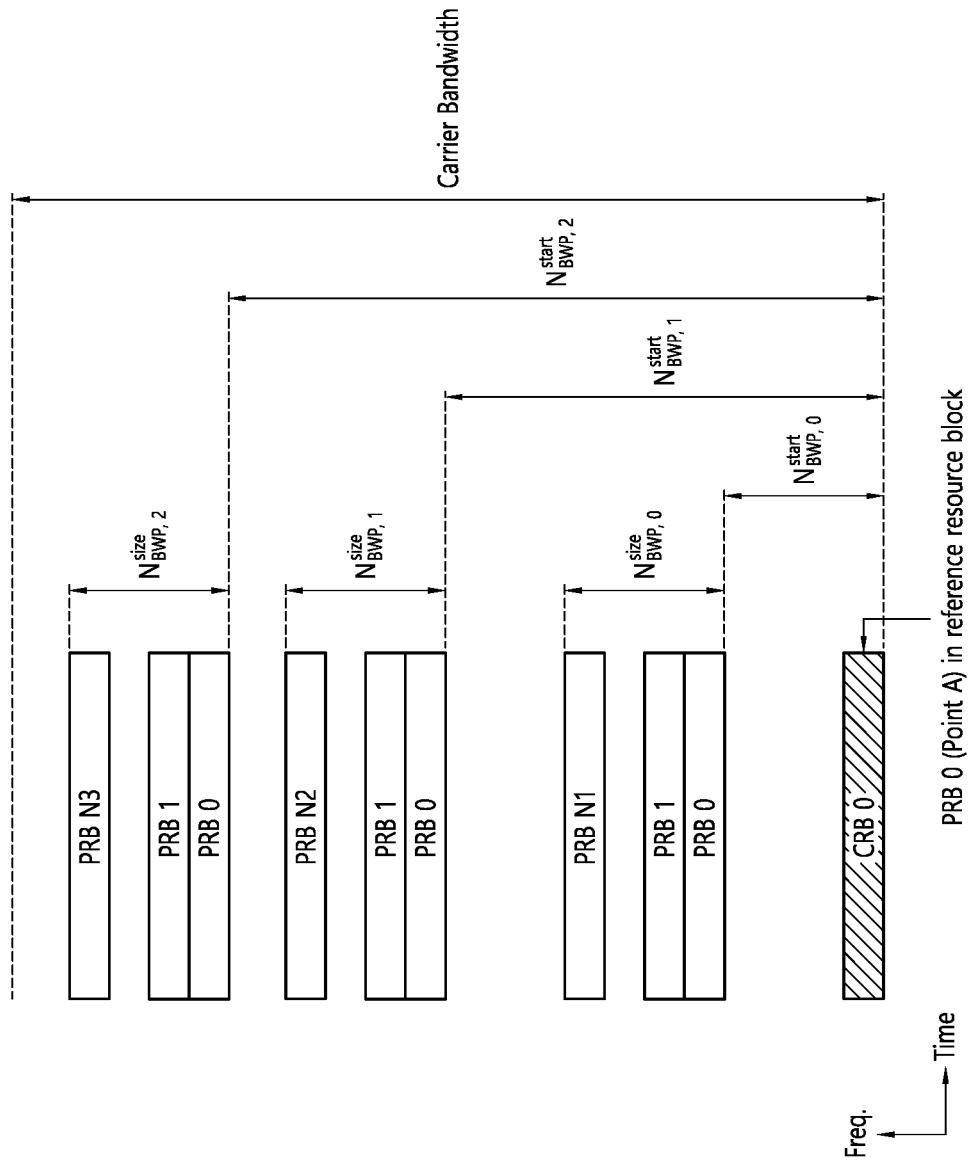
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
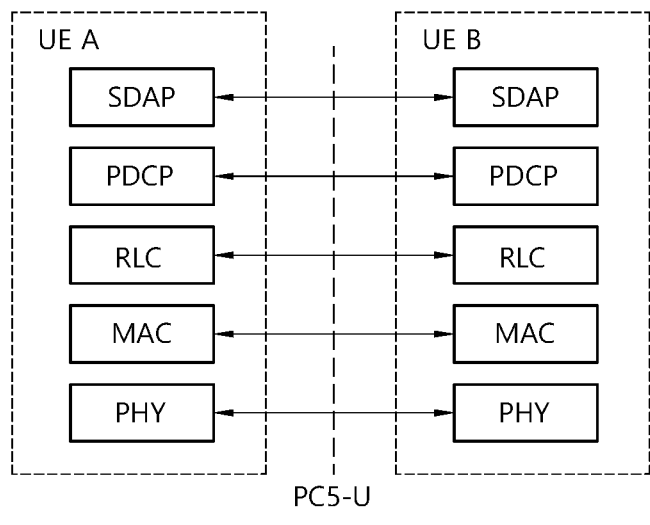
FIG. 8 shows a radio protocol architecture for a SL communication, in accordance with an embodiment of the present disclosure.
Figure 8:
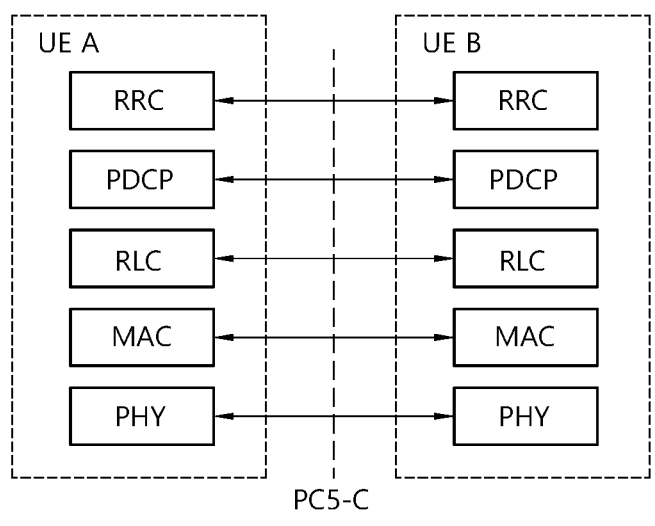

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
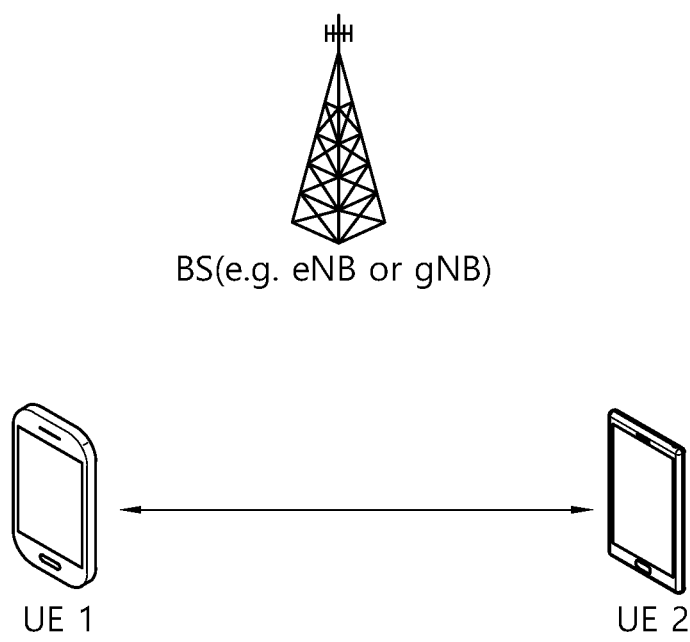
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
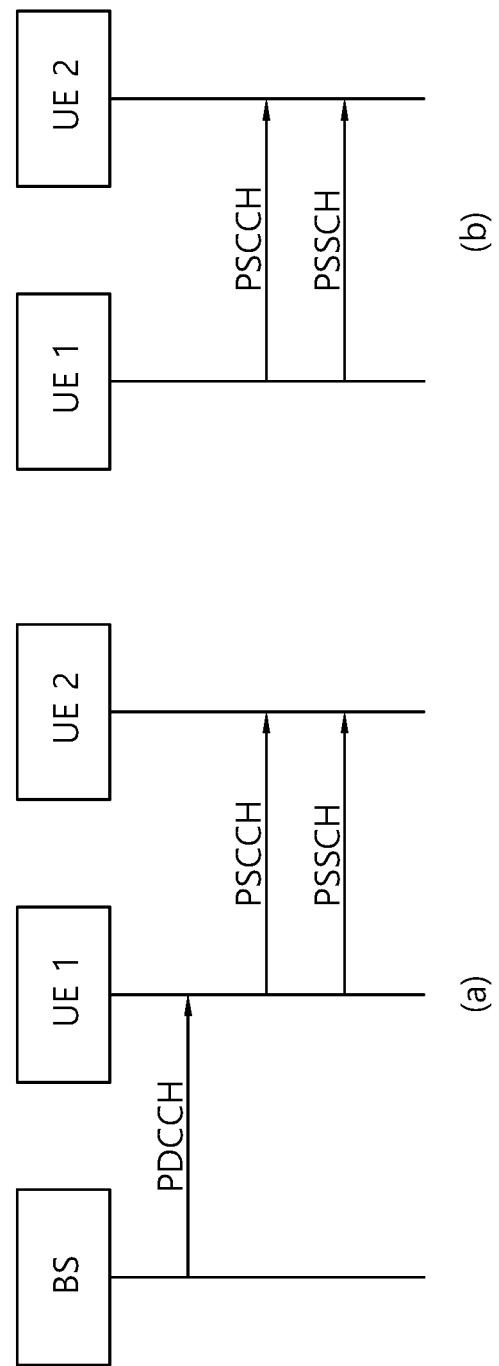
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
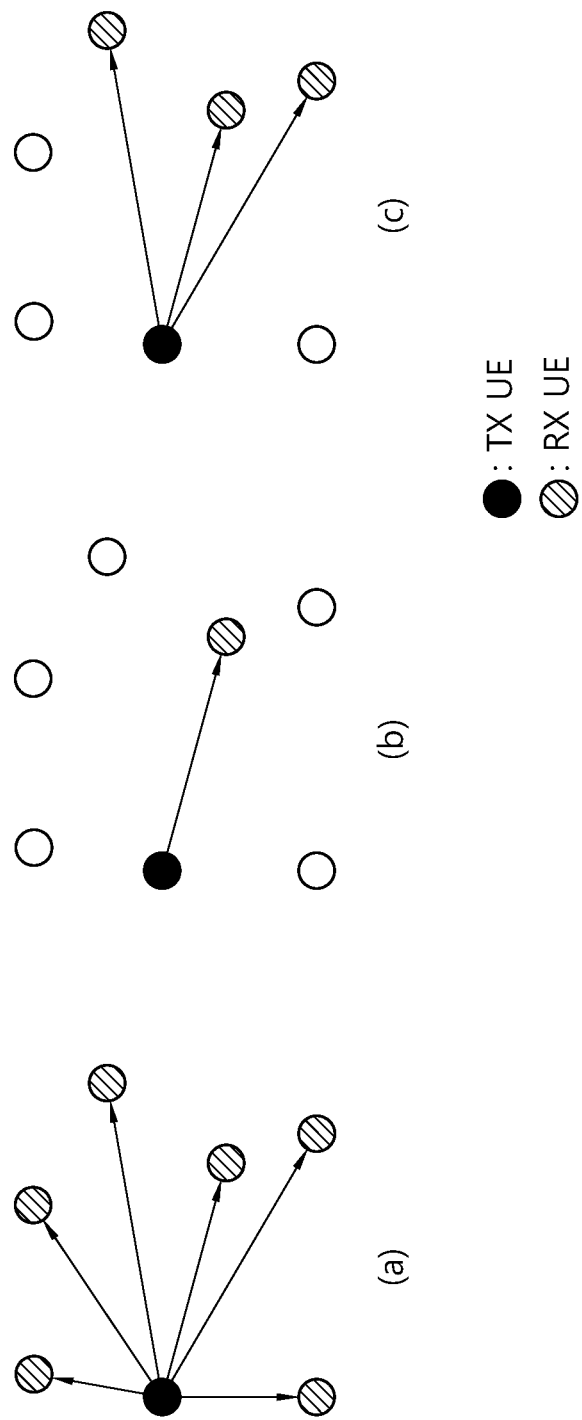
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the next-generation communication system, various use cases may be supported. For example, a service for communication such as an autonomous vehicle, a smart car, or a connected car may be considered. For this service, each vehicle may send and receive information as a communication UE, select resources for communication with or without the base station's help depending on the situation, and send and receive messages between UEs. Meanwhile, in the present specification, for example, a transmitting UE (TX UE) may be a UE transmitting data to a (target) receiving UE (RX UE). For example, the TX UE may be a UE performing PSCCH and/or PSSCH transmission. And/or the TX UE may be a UE that transmits an SL CSI-RS and/or an SL CSI report request indicator to a (target) RX UE. And/or the TX UE may be a UE transmitting a (control) channel (e.g., PSCCH, PSSCH, etc.) and/or a reference signal on the (control) channel (e.g., DM-RS, CSI-RS, etc.) to be used for the SL RLM and/or SL RLF operation of the (target) RX UE. And/or the TX UE may be a UE that transmits a sidelink synchronization signal block (S-SSB) or a sidelink SS/PSBCH block to a (target) RX UE.

On the other hand, in this specification, for example, a receiving UE (RX UE) may be a UE transmitting SL HARQ feedback to the TX UE depending on whether the decoding success of the data received from a transmitting UE (TX UE) and/or the detection/decoding success of the PSCCH (related to the PSSCH scheduling) transmitted by the TX UE. And/or an RX UE may be a UE that performs SL CSI transmission to a TX UE based on the SL CSI-RS and/or the SL CSI report request indicator received from the TX UE. And/or an RX UE may be a UE transmitting SL (L1) RSRP measurement value measured based on a (predefined) reference signal received from a TX UE and/or SL (L1) RSRP report request indicator. And/or an RX UE may be a UE that transmits its own data to a TX UE. And/or a RX UE may be a UE that performs SL RLM and/or SL RLF operation based on a (pre-configured) (control) channel received from a TX UE and/or a reference signal on the (control) channel. And/or an RX UE may be a UE that receives an S-SSB or SL SS/PSBCH block from a TX UE and performs initial access.

On the other hand, in the NR V2X communication system, a transmitting UE (TX UE) may transmit an S-SSB or a sidelink SS/PSBCH block to a receiving UE (RX UE). The receiving UE may perform initial access using the S-SSB or sidelink SS/PSBCH block received from the transmitting UE. The S-SSB or sidelink SS/PSBCH block may include a sidelink primary synchronization signal (S-PSS), sidelink secondary synchronization signal (S-SSS), sidelink physical broadcast channel (PSBCH). The receiving UE may obtain initial signal detection and synchronization using the S-PSS received from the transmitting UE. A receiving UE may obtain detailed synchronization by using the S-SSS received from the transmitting UE together with the S-PSS signal, and may detect the synchronization signal ID. A receiving UE may receive a master information block (MIB) through a PSBCH received from a transmitting UE, and may obtain basic system information included in the MIB. Therefore, an S-PSS, an S-SSS and a PSBCH included in an S-SSB or SL SS/PSBCH block may be very important signals for a receiving UE to obtain synchronization and basic system information, for normal data communication, the receiving UE may have to initially receive and decode the S-SSB.

[Condition 1] For example, when a transmitting UE performs SL transmission in addition to the S-PSS, S-SSS and PSBCH transmission to a receiving UE within a slot, a predetermined time interval following from the starting point of the slot may be a symbol interval for the receiving UE to perform an AGC operation, the predetermined time interval preceding the end point of the slot may be a symbol interval for the transmitting UE to perform switching between the transmitting operation and the receiving operation. In this case, a symbol period for the receiving UE to perform the AGC operation may be referred to as an AGC period, a symbol period for the transmitting UE to perform switching between a transmission operation and a reception operation may be referred to as a TX/RX switching gap period. For example, the length of the AGC period may be defined or (pre)configured to be constant regardless of a subcarrier spacing (SCS) used for SL communication. Alternatively, for example, the length of the AGC period may be defined differently or (pre)configured according to the SCS. At this time, if the length of the AGC period is defined or (pre)configured to be constant regardless of the SCS, the number of AGC symbols included in the AGC period may be variable or defined/configured differently according to the SCS. Specifically, for example, when SCS is 15 kHz, 30 kHz, 60 kHz, and 120 kHz, respectively, the number of AGC symbols may be defined/configured to 1, 1, 2, and 4, respectively. Also, for example, the length of the TX/RX switching gap period may be defined or (pre)configured to be constant regardless of the SCS. Alternatively, for example, the length of the TX/RX switching gap period may be defined differently or (pre)configured according to the SCS. At this time, if the length of the TX/RX switching gap period is defined or (pre)configured to be constant regardless of SCS, the number of GAP symbols included in the TX/RX switching gap period may be variable or defined/configured differently according to the SCS. Specifically, for example, when the SCS is 15 kHz, 30 kHz, 60 kHz, and 120 kHz, respectively, the number of GAP symbols may be defined/configured to one, one, two, and four, respectively.

[Condition 2] For example, a transmitting UE may transmit an S-PSS in one or more AGC symbols included in an AGC period. Or, for example, a transmitting UE may transmit a PSBCH having the same transmission power as an S-PSS in one or more AGC symbols included in an AGC period. Or, for example, a transmitting UE may transmit by mapping a DM-RS (e.g., PSBCH DM-RS) to the same symbol as a PSBCH in a form inserted into the PSBCH in one or more AGC symbols included in an AGC period. In this case, the transmission power of a signal or channel transmitted in one or more AGC symbols included in the AGC period may be determined or configured to be the same as the transmission power of the S-PSS, S-SSS, or PSBCH.

Hereinafter, in the present disclosure, an S-SSB structure for improving the CFO estimation performance of a receiving UE under the above conditions (condition 1 and/or condition 2) is proposed. In the S-SSB structure proposed in the present disclosure, since the S-PSS transmission power of a transmitting UE is different from the S-SSS transmission power and the PSBCH transmission power, a transition period for adapting transmit power through a transmit power amplifier of the transmitting UE before/after a symbol in which the S-PSS is transmitted may be required. For example, an AGC symbol existing before a symbol in which the S-PSS is transmitted may be a transition period. And/or, for example, it is possible to define or configured a guard period between the symbol in which the S-PSS is transmitted and the symbol which exists thereafter in which the S-SSS is transmitted, the guard period may be a transition period. In this case, for example, a transmitting UE may transmit a random signal in a symbol included in the guard period. Or, for example, a transmitting UE may transmit a PSBCH in a symbol included in the guard period. At this time, for example, a DM-RS may be transmitted through a symbol through which PSBCH is transmitted, it may help the channel estimation of a receiving UE. Or, for example, a DM-RS may not be transmitted through a symbol in which PSBCH is transmitted, through this, it is possible to prevent distorted channel estimation of a receiving UE. The structure of an S-SSB signal proposed in the present disclosure is as follows.

Figure 12:
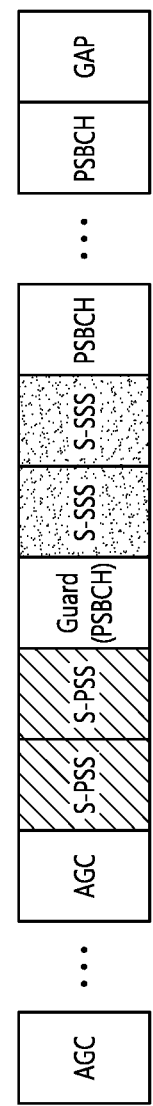
FIG. 12 shows a structure of an SL SSB according to an embodiment of the present disclosure.

FIG. 12 shows a structure of an SL SSB according to an embodiment of the present disclosure. The embodiment of FIG. 12 may be combined with various embodiments of the present disclosure.

Referring to FIG. 12, for example, a transmitting UE may transmit an S-PSS to a receiving UE in two consecutive symbols immediately after one or more AGC periods in a slot. In addition, a transmitting UE may transmit an S-SSS to a receiving UE in two consecutive symbols following two consecutive symbols for transmitting an S-PSS in a slot. In this case, a guard period may be defined or (pre)configured between the second symbol among two consecutive symbols in which S-PSS is transmitted and the first symbol among two consecutive symbols in which S-SSS is transmitted. In this way, since the S-PSS and the S-SSS are transmitted in two consecutive symbols that are different from each other, the change in the channel can be minimized, detection performance of S-PSS and S-SSS may be improved through a combining gain of the receiving UE. In this case, the receiving UE may perform the first signal synchronization using the S-PSS. Also, the receiving UE may obtain rough time/frequency synchronization using the S-PSS signal. In addition, the receiving UE may acquire residual time/frequency synchronization using the S-SSS signal. In addition, since the S-SSS is transmitted in two consecutive symbols, the receiving UE can accurately estimate the frequency offset even when the magnitude of the residual time/frequency offset due to UE mobility is large.

Figure 13:
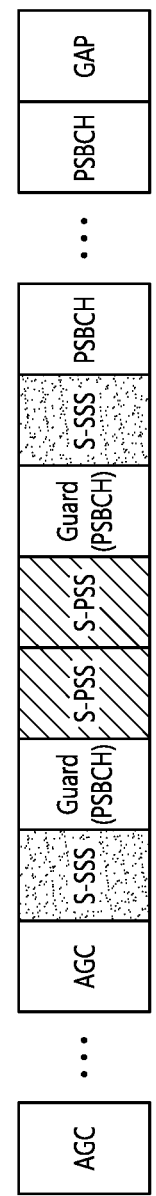
FIG. 13 shows a structure of an SL SSB according to an embodiment of the present disclosure.

FIG. 13 shows a structure of an SL SSB according to an embodiment of the present disclosure. The embodiment of FIG. 13 may be combined with various embodiments of the present disclosure.

Referring to FIG. 13, for example, a transmitting UE may transmit an S-PSS to a receiving UE in two consecutive symbols immediately after an AGC period in a slot. And the transmitting UE transmits an S-SSS to the receiving UE in one symbol preceding the first symbol among two consecutive symbols for transmitting the S-PSS in the slot, the S-SSS may be transmitted to the receiving UE in one symbol following the second symbol among two consecutive symbols for transmitting the S-PSS. In this case, the receiving UE may obtain rough time/frequency synchronization using the S-PSS. In addition, the receiving UE may minimize the estimation error by inducing a relatively large frequency offset value through the accumulation of small-sized residual frequency offset values in the time interval between two spaced symbols in which the S-SSS is transmitted. In this case, the receiving UE may acquire an accurate frequency offset value by reflecting/compensating a time interval between two symbols in which the S-SSS is transmitted. At this time, since the S-PSS transmission power of the transmitting UE and the transmission power of a signal transmitted in another symbol are different, a guard period serving as a transition period between the first symbol in which the S-PSS is transmitted and the first symbol in which the S-SSS is transmitted may be defined or (pre)configured. In addition, a guard period serving as a transition period between the second symbol in which the S-PSS is transmitted and the second symbol in which the S-SSS is transmitted may be defined or (pre)configured. Accordingly, the time interval between two symbols in which the S-SSS is transmitted may be 4 symbols.

Figure 14:
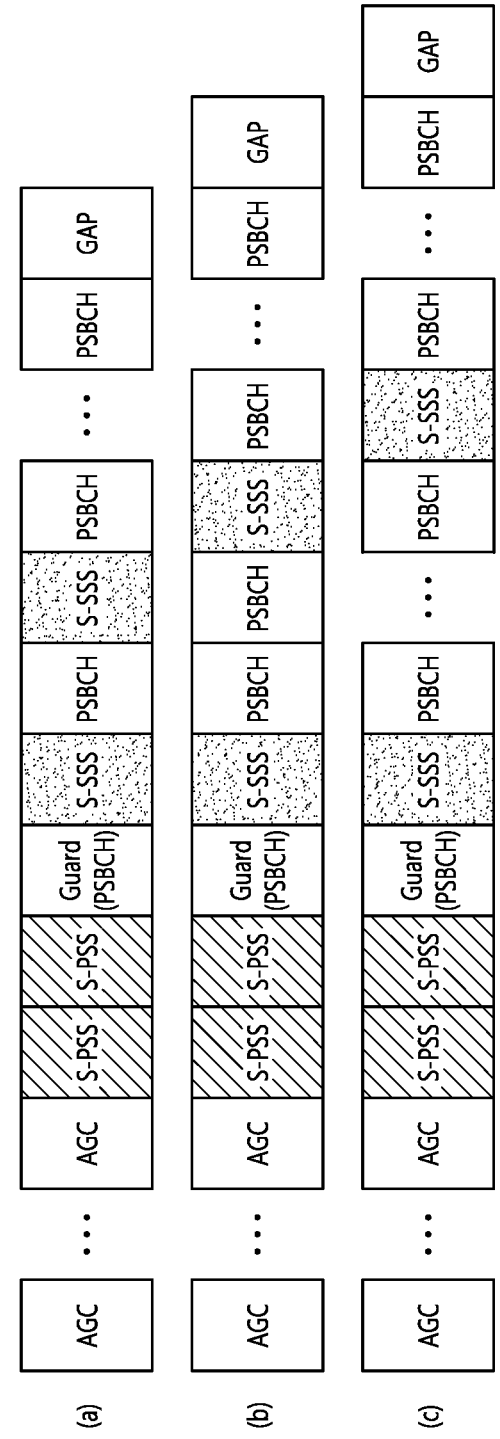
FIG. 14 shows a structure of an SL SSB according to an embodiment of the present disclosure.

FIG. 14 shows a structure of an SL SSB according to an embodiment of the present disclosure. The embodiment of FIG. 14 may be combined with various embodiments of the present disclosure.

Referring to FIG. 14, for example, in order to reduce overhead due to a guard period defined or (pre)configured in FIG. 13, a transmitting UE may transmit an S-PSS to the receiving UE at two consecutive symbols immediately after the AGC period in the slot. In this case, the AGC period may serve as a transition period before the symbol in which the S-PSS is transmitted. In addition, the transmitting UE may transmit the S-SSS in two spaced symbols following two consecutive symbols for transmitting the S-PSS in the slot. In this case, a guard period may be defined or (pre)configured between the second symbol of two consecutive symbols in which the S-PSS is transmitted and the first symbol among the two spaced symbols in which the S-SSS is transmitted. In addition, at this time, so that the receiving UE can estimate a small residual frequency offset value using the S-SSS, the transmitting UE may transmit a PSBCH to the receiving UE in a time interval between two spaced symbols in which the S-SSS is transmitted. For example, in (a) of FIG. 14, since the time interval between two spaced symbols in which the S-SSS is transmitted is one symbol, the PSBCH may be transmitted in the one symbol. For example, in (b) of FIG. 14, since a time interval between two spaced symbols in which S-SSS is transmitted is two symbols, PSBCH may be transmitted in the two symbols. For example, in (c) of FIG. 14, the PSBCH may be transmitted in two or more symbols existing between two spaced symbols in which the S-SSS is transmitted according to the magnitude of the residual frequency offset value. In this case, the S-SSS is used for channel estimation of the receiving UE together with the DM-RS included in the symbol in which the PSBCH is transmitted, thereby improving the channel estimation performance of the receiving UE.

Figure 15:
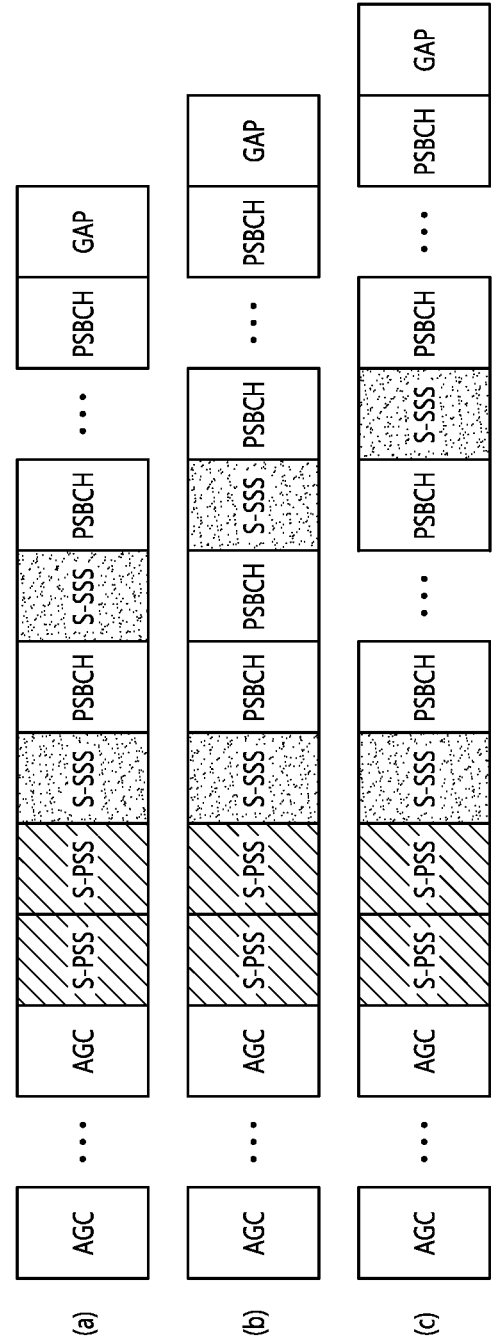
FIG. 15 shows a structure of an SL SSB according to an embodiment of the present disclosure.

FIG. 15 shows a structure of an SL SSB according to an embodiment of the present disclosure. The embodiment of FIG. 15 may be combined with various embodiments of the present disclosure.

Referring to FIG. 15, for example, a transmitting UE may transmit an S-PSS to a receiving UE in two consecutive symbols immediately after an AGC period in a slot. In addition, the transmitting UE may transmit an S-SSS in two spaced symbols following two consecutive symbols for transmitting the S-PSS in the slot. At this time, in (a), (b), and (c) of FIG. 14, in order to delete overhead of a defined or (pre)configured guard period between the second symbol of two consecutive symbols in which S-PSS is transmitted and the first symbol of two spaced symbols in which S-SSS is transmitted, a second symbol among two consecutive symbols in which S-PSS is transmitted and a first symbol among two spaced symbols in which S-SSS is transmitted may be continuous. Through such a structure, spectral efficiency may be further improved. That is, in (a), (b), and (c) of FIG. 15, a transition period may not be defined or (pre)configured between the second symbol of two consecutive symbols in which S-PSS is transmitted and the first symbol of two consecutive symbols in which S-SSS is transmitted. In this case, only symbols in which the S-PSS is transmitted may serve as a transition period. Alternatively, only symbols in which S-SSS is transmitted may serve as a transition period. Alternatively, symbols in which S-PSS is transmitted and symbols in which S-SSS is transmitted may take on the role of a transition period. For example, symbols in which S-PSS is transmitted and symbols in which S-SSS is transmitted may take on the role of the transition period by dividing the roles in half. In addition, at this time, so that the receiving UE can estimate a small residual frequency offset value using the S-SSS, the transmitting UE may transmit the PSBCH to the receiving UE in a time interval between two spaced symbols in which the S-SSS is transmitted. For example, in (a) of FIG. 15, since the time interval between two spaced symbols in which S-SSS is transmitted is one symbol, PSBCH may be transmitted in the one symbol. Alternatively, for example, in (b) of FIG. 15, since the time interval between two spaced symbols in which the S-SSS is transmitted is two symbols, the PSBCH may be transmitted in the two symbols. Alternatively, for example, in (c) of FIG. 15, the PSBCH may be transmitted in three or more symbols existing between two spaced symbols in which the S-SSS is transmitted according to the magnitude of the residual frequency offset value. In this case, the S-SSS is used for channel estimation of the receiving UE together with the DM-RS included in the symbol in which the PSBCH is transmitted, thereby improving the channel estimation performance of the receiving UE.

Figure 16:
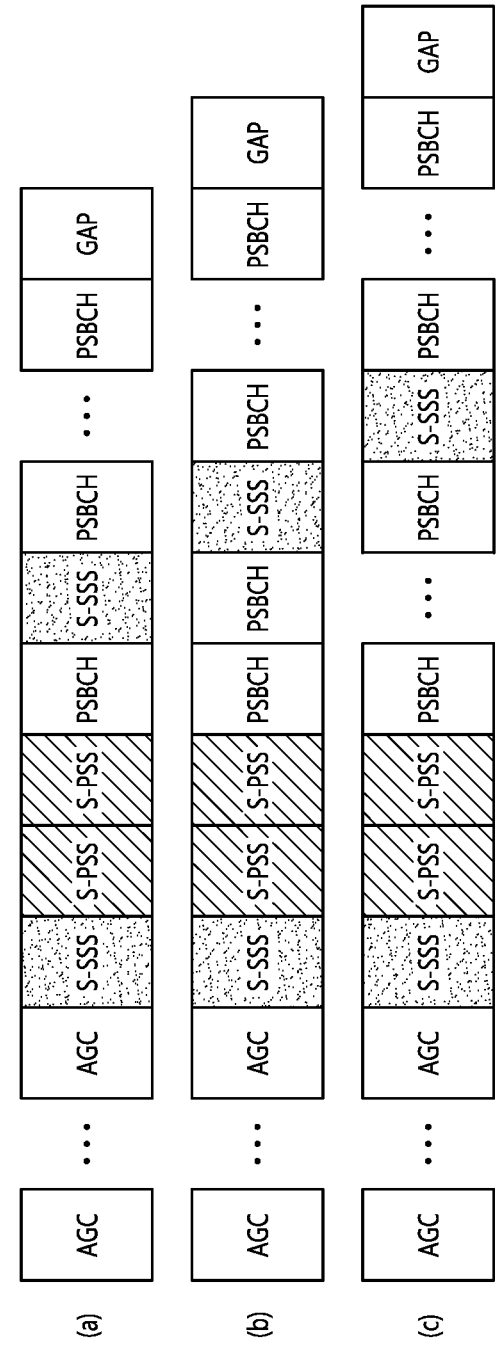
FIG. 16 shows a structure of an SL SSB according to an embodiment of the present disclosure.

FIG. 16 shows a structure of an SL SSB according to an embodiment of the present disclosure. The embodiment of FIG. 16 may be combined with various embodiments of the present disclosure.

Referring to FIG. 16, for example, in FIGS. 16(a) and (b), a transmitting UE may transmit an S-PSS to a receiving UE in two consecutive symbols after an AGC period in a slot. And the transmitting UE transmits an S-SSS in one symbol existing between the AGC period in the slot and the first symbol among two consecutive symbols in which the S-PSS is transmitted, and the S-SSS in one symbol following two consecutive symbols for transmitting the S-PSS. As in (a), (b), and (c) of FIG. 15, in FIGS. 16(a) and (b), the overhead due to the transition period can be minimized, a small residual frequency offset may be estimated in a time interval between two spaced symbols in which S-SSS is transmitted. In addition, in (a) and (b) of FIG. 16, S-PSS and PSBCH may be transmitted in a time interval between two spaced symbols in which S-SSS is transmitted. For example, in (a) of FIG. 16, since the time interval between two spaced symbols in which S-SSS is transmitted is three symbols, in the three symbols, S-PSS (2 symbols) and PSBCH (1 symbol) may be sequentially transmitted. Or, for example, in (b) of FIG. 16, since the time interval between two spaced symbols in which S-SSS is transmitted is 4 symbols, in the four symbols, S-PSS (2 symbols) and PSBCH (2 symbols) may be sequentially transmitted. Or, for example, in FIG. 16(c), S-PSS (2 symbols) and PSBCH (3 symbols or more) may be transmitted in a time interval between two spaced symbols in which S-SSS is transmitted depending on the magnitude of the residual frequency offset value.

Figure 17:
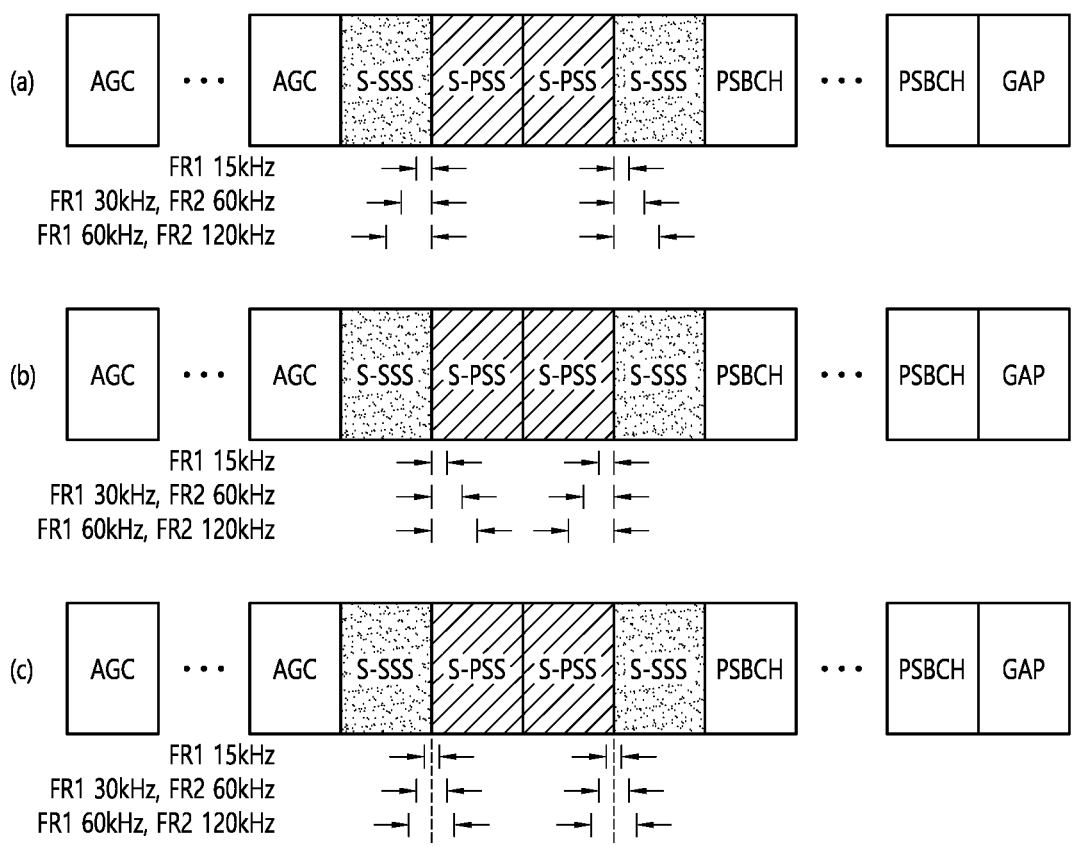
FIG. 17 shows a structure of an SL SSB according to an embodiment of the present disclosure.

FIG. 17 shows a structure of an SL SSB according to an embodiment of the present disclosure. The embodiment of FIG. 17 may be combined with various embodiments of the present disclosure.

Referring to FIG. 17, for example, a transmitting UE may transmit an S-PSS to a receiving UE in two consecutive symbols after an AGC period in a slot. And the transmitting UE transmits an S-SSS in one symbol existing between the AGC period in the slot and the first symbol among two consecutive symbols in which the S-PSS is transmitted, and the S-SSS in one symbol immediately after the second symbol among the two consecutive symbols for transmitting the S-PSS. Through such a structure, the overhead due to the transition period can be minimized, the receiving UE may estimate a small residual frequency offset through a time interval between two spaced symbols in which the S-SSS is transmitted. In this case, two spaced symbols in which the S-SSS is transmitted may be transmitted before and after two consecutive symbols in which the S-PSS is transmitted, respectively. Also, there may not be a symbol for transmitting the PSBCH or the like or a guard symbol that can be used as a transition period between the symbol in which the S-PSS is transmitted and the symbol in which the S-SSS is transmitted. Accordingly, in case that different maximum power reduction (MPR) values are applied to each symbol in which the S-PSS is transmitted and the symbol in which the S-SSS is transmitted, and so a transition period is required between a symbol in which S-PSS is transmitted and a symbol in which S-SSS is transmitted, a transition period may be defined or (pre)configured in a symbol in which the S-PSS is transmitted and/or a symbol in which the S-SSS is transmitted.

For example, in (a) of FIG. 17, a transition period may be defined or (pre)configured in a symbol in which an S-SSS is transmitted. Since an initial detection of an SL signal of a receiving UE is made through detection of the symbol through which an S-PSS is transmitted, there is an advantage that (a) of FIG. 17 can maintain high initial S-SSB detection performance, and detection and decoding of symbols in which S-PSS is transmitted can be performed using synchronization information with relatively high accuracy obtained from the detection of symbols in which the S-PSS is transmitted.

Alternatively, for example, in (b) of FIG. 17, a transition period may be defined or (pre)configured in a symbol in which an S-PSS is transmitted. It uses a characteristic equal to the detection performance of a symbol in which the S-SSS is transmitted or higher than the detection performance of a symbol in which the S-SSS is transmitted, even if the transition period is defined or (pre)configured in the symbol in which the S-PSS is transmitted, which has relatively high transmission power compared to the S-SSS. (b) of FIG. 17 has an advantage that it is possible to minimize the performance degradation of joint detection and decoding of the symbol finally transmitted S-PSS and the symbol transmitted S-SSS.

Alternatively, for example, in (c) of FIG. 17, a part of a transition period may be defined in a symbol in which S-PSS is transmitted, and the remaining part of the transition period may be defined or (in advance) in a symbol in which S-SSS is transmitted. Specifically, for example, a half of the transition period may be defined for a symbol in which S-PSS is transmitted and the other half of the transition period may be defined or (in advance) configured in a symbol in which S-SSS is transmitted. Alternatively, for example, a ratio of a transition period defined or (pre)configured in a symbol in which S-PSS is transmitted and a symbol in which S-SSS is transmitted may be arbitrarily defined or (pre)configured. Through this, it is possible to relatively minimize the degradation of detection and decoding performance due to the transition period compared to 17(a) and 17(b) in which a transition period is defined or (in advance) only for a symbol in which S-PSS is transmitted or a symbol in which S-SSS is transmitted. In addition, as a result of FIG. 17(c), there is an advantage that joint sensing and decoding performance of a symbol in which an S-PSS is transmitted and a symbol in which an S-SSS is transmitted can be maintained almost without degradation.

Figure 18:
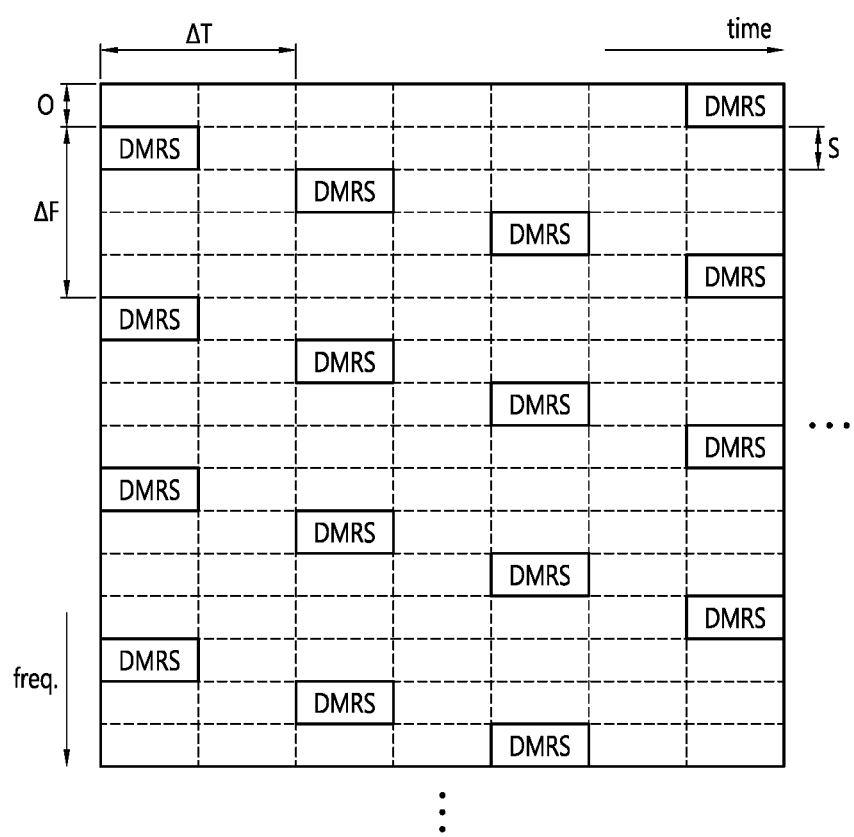
FIG. 18 shows a structure of a PSBCH according to an embodiment of the present disclosure.

FIG. 18 shows a structure of a PSBCH according to an embodiment of the present disclosure. 18 may be combined with various embodiments of the present disclosure.

Referring to FIG. 18, the transmitting UE may map the DM-RS to the PSBCH as shown in FIG. 18 and transmit it to the receiving UE. For example, the DM-RS may be mapped to a symbol through which a transmitting UE transmits a PSBCH and transmitted to a receiving UE. Specifically, for example, the DM-RS is mapped for every $\Delta T$ symbol through which the PSBCH is transmitted, and every $\Delta F$ subcarrier from a subcarrier determined based on an offset by O subcarriers within one symbol. can be mapped. At this time, according to the cyclic prefix (CP) and SCS used for SL communication, interval $\Delta T$ between PSBCH symbols to which DM-RS is mapped, inter-subcarrier spacing $\Delta F$ to which DM-RS is mapped within one symbol in which PSBCH is transmitted, O, which is an offset value for determining a subcarrier to which DM-RS is first mapped in one symbol on which PSBCH is transmitted, and a shift value S for a position of a subcarrier to which a DM-RS is mapped for every PSBCH symbol may be differently pre-configured or configured. The value of the parameter (e.g., $\Delta T$, $\Delta F$, O, S, etc.) may have an integer value greater than or equal to 0.

For example, when the length of a CP is short, a large $\Delta F$ value may be (pre)configured because a channel delay spread value for which estimation is required is small, when the length of the CP is large, a small $\Delta F$ value may be (pre)configured because the channel delay spread value required to be estimated is large.

And/or, for example, O, that is an offset value for determining a subcarrier to which a DM-RS is first mapped within one symbol on which PSBCH is transmitted, may be adjusted or (pre)configured for symbols in which each PSBCH is transmitted as needed, when the number of symbols in which PSBCHs used for SL communication are transmitted varies according to a slot format.

And/or, for example, when the speed according to the mobility of the UE is small, it's a case that the value of the Doppler spread to be estimated is small, so a large $\Delta T$ value may be (pre)configured, and conversely, when the speed of the UE is large, a small $\Delta T$ value may be (pre)configured because the value of the Doppler spread to be estimated is large.

On the other hand, a transmitting UE does not map a DM-RS signal to the same subcarrier position for each symbol in which the PSBCH is transmitted, but maps the DM-RS signal to the shifted subcarrier position for each symbol in which each PSBCH is transmitted. At this time, a non-zero shift value S, compared to the case where the S value is 0 (=no shift), makes it possible to efficiently perform channel estimation for all subcarrier positions for a symbol in which a given number of PSBCHs are transmitted.

On the other hand, an S-PSS constituting an S-SSB must be designed to be able to lower the cross-correlation with a PSS signal used for a Uu link, and at the same time reduce the correlation with an SSS signal and an S-SSS signal used for the Uu link, while at the same time minimizing the ambiguity of a CFO. In the present disclosure, in order to satisfy the above conditions, a method of transmitting to a receiving UE after generating an S-PSS sequence based on a remaining m-sequence (hereinafter "Second m-sequence of S-SSS"), not a m-sequence (hereinafter "the first m-sequence of S-SSS") used to generate a S-PSS sequence, among the two m-sequences constituting the Gold sequence used by the transmitting UE to generate the S-SSS sequence, That is, the transmitting UE may generate an S-PSS sequence based on an m-sequence different from the PSS signal used for the Uu link and transmit it to the receiving UE. In addition, the transmitting UE may generate an S-PSS sequence by using a cyclic shift value independent of cyclic shift values used when generating the PSS sequence, and transmit the generated S-PSS sequence to the receiving UE. Thus, by using a cyclic shift value that even divides the entire sequence length by an even number, a tolerable CFO value that minimizes ambiguity by the CFO can be maximized. In this case, when the number of symbols constituting the S-PSS signal is two and the number of IDs (or hypotheses) to be transmitted by the S-PSS signal is two, the following two configurations are possible.

1) Two S-PSS symbols are constructed by repeating the same S-PSS symbol. In this case, as the cyclic shift value used for generation of m-sequence, when the total sequence length is 127, values separated by 63 or 64 (dividing the 127 by two) are used.
2) An S-PSS signal is constructed using two different S-PSS symbols. At this time, as the cyclic shift value used to generate the m-sequence, when the total sequence length is 127, values separated by 31 or 32 (dividing the 127 into 4 equal parts) are used, and 2 symbols each use 2 values per symbol out of 4 cyclic shift values.

In both cases, the cyclic shift value is generated using m-sequence to ensure that the finally generated S-PSS symbol has the minimum PAPR or Cubic Metric value. Also, an initial value used for generating the m-sequence may be the same as an initial value used for generating the S-SSS.

Examples of cases 1) and 2) above are as follows.

S-PSS m-sequence for the case of 1)

$ID_2=\{0,1\}$ $d_{PSS}(n)=1-2x(m)$ $m=(n+64\cdot ID_2+14)\bmod 127$ $0\leq n<127$ $x(i+7)=(x(i+1)+x(i))\bmod 2$ $x(6:0)=[0\ 0\ 0\ 0\ 0\ 0\ 1]$ or $ID_2=\{0,1\}$ $d_{PSS}(n)=1-2x(m)$ $m=(n+63\cdot ID_2+17)\bmod 127$ $0\leq n<127$ $x(i+7)=(x(i+1)+x(i))\bmod 2$ $x(6:0)=[0\ 0\ 0\ 0\ 0\ 0\ 1]$ or $ID_2=\{0,1\}$ $d_{PSS}(n)=1-2x(m)$ $m=(n+40\cdot ID_2+80)\bmod 127$ $0\leq n<127$ $x(i+7)=(x(i+1)+x(i))\bmod 2$ $x(6:0)=[0\ 0\ 0\ 0\ 0\ 0\ 1]$ S-PSS m-sequence for the case of 2)

$ID_2=\{0,1\}$ $d_{PSS\_1}(n)=1-2x(m_1)$ $m_1=(n+62 \cdot ID_2+18)\bmod 127$ $d_{PSS\_2}(n)=1-2x(m_2)$ $m_2=(n+62 \cdot ID_2+49)\bmod 127$ $0 \le n < 127$ $x(i+7)=(x(i+1)+x(i))\bmod 2$ $x(6:0)[0\ 0\ 0\ 0\ 0\ 0\ 1]$ or $ID_2=\{0,1\}$ $d_{PSS\_1}(n)=1-2x(m_1)$ $m_1=(n+31 \cdot ID_2+18)\bmod 127$ $d_{PSS\_2}(n)=1-2x(m_2)$ $m_2=(n+31 \cdot ID_2+80)\bmod 127$ $0 \le n < 127$ $x(i+7)=(x(i+1)+x(i))\bmod 2$ $x(6:0)[0\ 0\ 0\ 0\ 0\ 0\ 1]$ or $ID_2=\{0,1\}$ $d_{PSS\_1}(n)=1-2x(m_1)$ $m_1=(n+63 \cdot ID_2+18)\bmod 127$ $d_{PSS\_2}(n)=1-2x(m_2)$ $m_2=(n+63 \cdot ID_2+49)\bmod 127$ $0 \le n < 127$ $x(i+7)=(x(i+1)+x(i))\bmod 2$ $x(6:0)[0\ 0\ 0\ 0\ 0\ 0\ 1]$ or $ID_2=\{0,1\}$ $d_{PSS\_1}(n)=1-2x(m_1)$ $m_1=(n+63 \cdot ID_2+17)\bmod 127$ $d_{PSS\_2}(n)=1-2x(m_2)$ $m_2=(n+63 \cdot ID_2+49)\bmod 127$ $0 \le n < 127$ $x(i+7)=(x(i+1)+x(i))\bmod 2$ $x(6:0)[0\ 0\ 0\ 0\ 0\ 0\ 1]$ As another embodiment, there is a method of generating a m-sequence to be used for two different S-PSS symbols, using the same value as the m-sequence polynomial and the initial value used for the PSS symbol, and different values of cyclic shift. In this case, the cyclic shift value of the S-PSS is determined as a value satisfying the following conditions within the range of the cyclic shift value not used by the PSS.

1) The cyclic shift value that has the largest difference from the cyclic shift value used for the PSS symbol m-sequence 2) Set the cyclic shift values used for S-PSS m-sequence to have the largest difference from each other.

From the above 1) condition, the CFO value that can be detected may have a maximum value while preventing the S-PSS and PSS detection performance from having ambiguity, from the above 2) condition, the CFO value that can be detected may have a maximum value while preventing the S-PSS detection performance from having ambiguity.

An example of generating an S-PSS symbol m-sequence that satisfies the above condition is as follows. In this case, it is assumed that the information (or SLSS-ID) transmitted by the S-PSS is 1 bit (or two SLSS-IDs).

1) A total of two m-sequences are generated, and the order of mapping two m-sequences to two S-PSS symbols is changed for the case of transmitting bit information '0' and the case of transmitting bit information '1'. For example, if the first and second m-sequences are mapped to the first and second S-PSS symbols, respectively, bit information '0' is transmitted, if the first and second m-sequences are used for the second and first S-PSS symbols, respectively, bit information '1' is transmitted.

2) Apply the design method of 1) using the second m-sequence of S-SSS.

An example of the m-sequence for the case of 1) is as follows.

$b=\{0,1\}$ $d^b_{PSS}(n)=1-2x(m)$ $m=(n+43 \cdot b+21)\bmod 127$ $0 \le n < 127$ $x(i+7)=(x(i+4)+x(i))\bmod 2$ $x(6:0)=[0\ 0\ 0\ 0\ 0\ 0\ 1]$ For example, when the bit information to be obtained by the receiving UE is '0', $d_{PSS\_1}(n)=d^0_{PSS}(n)$ may be transmitted through the first S-PSS symbol, $d_{PSS\_2}(n)=d^1_{PSS}(n)$ may be transmitted through the second S-PSS symbol. On the other hand, for example, when the bit information to be obtained by the receiving UE is '1', $d_{PSS\_1}(n)=d^1_{PSS}(n)$ may be transmitted through the first S-PSS symbol, $d_{PSS\_2}(n)=d^0_{PSS}(n)$ may be transmitted through the second S-PSS symbol.

An example of m-sequence for the case of 2) above is as follows.

$b=\{0,1\}$ $d^b_{PSS}(n)=1-2x(m)$ $m=(n+64 \cdot b+14)\bmod 127$ $0 \le n < 127$ $x(i+7)=(x(i+4)+x(i))\bmod 2$ $x(6:0)=[0\ 0\ 0\ 0\ 0\ 0\ 1]$ or $b=\{0,1\}$ $d^b_{PSS}(n)=1-2x(m)$ $m=(n+63\cdot b+17)\bmod 127$ $0\le n<127$ $x(i+7)=(x(i+4)+x(i))\bmod 2$ $x(6:0)=[0\ 0\ 0\ 0\ 0\ 0\ 1]$ or $b=\{0,1\}$ $d^b_{PSS}(n)=1-2x(m)$ $m=(n+40\cdot b+80)\bmod 127$ $0\le n<127$ $x(i+7)=(x(i+4)+x(i))\bmod 2$ $x(6:0)=[0\ 0\ 0\ 0\ 0\ 0\ 1]$ The following rules apply in common to the above three cases.

For example, when the bit information to be obtained by the receiving UE is '0', $d_{PSS\_1}(n)=d^0_{PSS}(n)$ can be transmitted through the first S-PSS symbol, $d_{PSS\_2}(n)=d^1_{PSS}(n)$ may be transmitted through the second S-PSS symbol. On the other hand, for example, when the bit information to be obtained by the receiving UE is '1', $d_{PSS\_1}(n)=d^1_{PSS}(n)$ may be transmitted through the first S-PSS symbol, $d_{PSS\_2}(n)=d^0_{PSS}(n)$ may be transmitted through the second S-PSS symbol.

For example, the range of the SLSS-ID may be determined based on bit information to be obtained by a receiving UE through an S-PSS. For example, when the bit information obtained by the receiving UE is '0', the range of the SLSS-ID may be determined as the range of the SLSS-ID for the INC UE. Or, for example, when the bit information obtained by the receiving UE is '1', the range of the SLSS-ID may be determined as the range of the SLSS-ID for the OOC UE. For example, the range of the SLSS-ID may be determined based on Equation 1.

SLSS-$ID=N_1+336*N_2$     [Equation 1]

For example, N2 may indicate bit information that a receiving UE should obtain through S-PSS. For example, N1 is {0, 1, . . . , 335}. For example, N2 may be a constant included in {0,1}.

Figure 19:
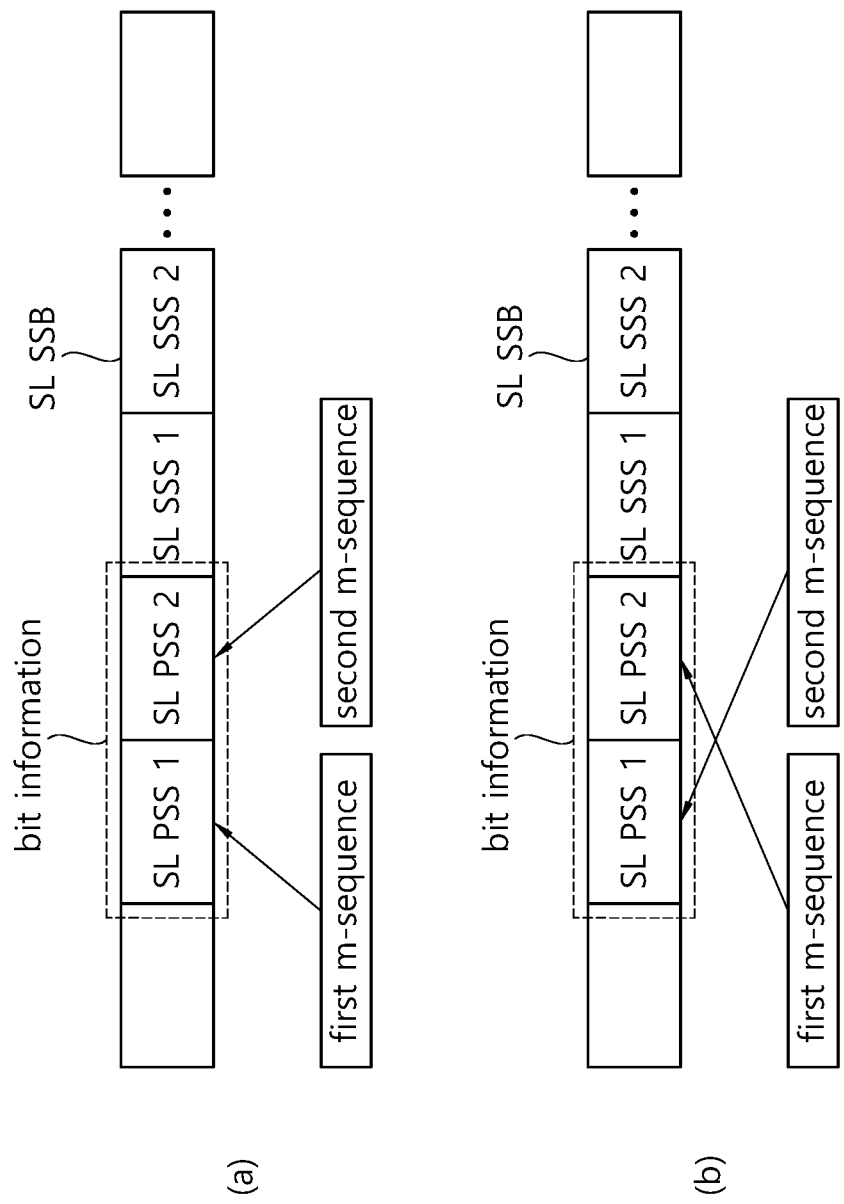
FIG. 19 shows a procedure for obtaining bit information according to a mapping order related to an SL PSS, a first m-sequence, and a second m-sequence, according to an embodiment of the present disclosure.

FIG. 19 shows a procedure for obtaining bit information according to a mapping order related to an SL PSS, a first m-sequence, and a second m-sequence, according to an embodiment of the present disclosure. The embodiment of FIG. 19 may be combined with various embodiments of the present disclosure.

Referring to FIG. 19, a transmitting UE may transmit an SL SSB to a receiving UE. For example, the SL SSB may include a first SL PSS symbol and a second SL PSS symbol. For example, the receiving UE may obtain bit information based on a mapping order related to the first SL PSS symbol and the second SL PSS symbol. For example, the bit information may be an SLSS ID. For example, (a) of FIG. 19 shows a state in which a first m-sequence is mapped to the first SL PSS symbol and a second m-sequence is mapped to the second SL PSS symbol. For example, the receiving UE may obtain bit information '0', based on an order in which the first m-sequence is mapped to the first SL PSS symbol and the second m-sequence is mapped to the second SL PSS symbol. For example, (b) of FIG. 19 shows a state in which a first m-sequence is mapped to the second SL PSS symbol and a second m-sequence is mapped to the first SL PSS symbol. For example, the receiving UE may obtain bit information '1', based on an order in which the first m-sequence is mapped to the second SL PSS symbol and the second m-sequence is mapped to the first SL PSS symbol.

In the present disclosure, after a receiving UE performs rough frequency synchronization using an S-PSS, an S-SSB structure is proposed in which the estimation performance of the residual frequency value can be improved using an S-SSS signal. In addition, a method for optimizing position of the DM-RS mapped to a symbol for transmitting a PSBCH by a transmitting UE according to CP and SCS used in SL communication is proposed. In addition, a method for generating and transmitting an S-PSS signal that has a low correlation with a Uu link PSS and is robust to a CFO is proposed.

According to an embodiment of the present disclosure, a transmitting UE may operate as follows. The transmitting UE may generate an S-PSS sequence, an S-SSS sequence, and a PSBCH DM-RS sequence according to the proposed method. And/or the transmitting UE may map the generated S-PSS sequence, S-SSS sequence, PSBCH DM-RS sequence, and PSBCH to time-frequency resources in a slot, according to the proposed method and the S-SSB structure of FIGS. 12 to 17. And/or the transmitting UE may transmit the S-SSB including the mapped S-PSS, S-SSS, PSBCH DM-RS and PSBCH to the receiving UE.

According to an embodiment of the present disclosure, a receiving UE may operate as follows. The receiving UE may receive the S-SSB transmitted by being mapped to the time-frequency resource in the slot according to the proposed method and the S-SSB structure of FIGS. 12 to 17 from a transmitting UE. And/or the receiving UE may obtain time-frequency synchronization based on the received S-SSB.

Figure 20:
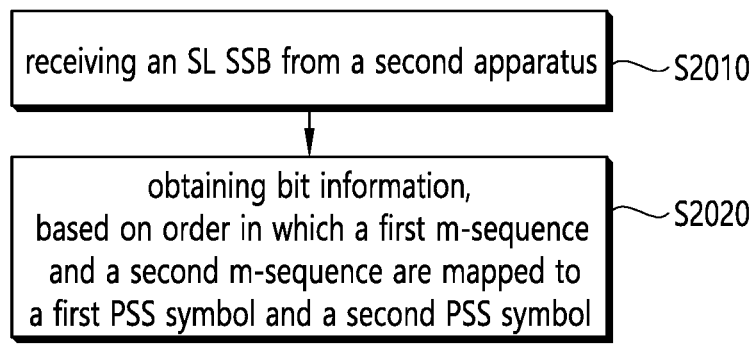
FIG. 20 shows a procedure for a first apparatus to receive an SL SSB from a second apparatus, according to an embodiment of the present disclosure.

FIG. 20 shows a procedure for a first apparatus to receive an SL SSB from a second apparatus, according to an embodiment of the present disclosure. The embodiment of FIG. 20 may be combined with various embodiments of the present disclosure.

Referring to FIG. 20, in step S2010, a first apparatus, may receive an SL SSB from second apparatus. For example, the SL SSB may include a first primary synchronization signal (PSS) symbol and a second PSS symbol, a first m-sequence may be mapped to the first PSS symbol or the second PSS symbol, and a second m-sequence may be mapped to a symbol to which the first m-sequence is not mapped among the first PSS symbol and the second PSS symbol. In step S2020, the first apparatus may obtain bit information based on an order in which the first m-sequence and the second m-sequence are mapped to the first PSS symbol and the second PSS symbol.

For example, based on the mapping of the first m-sequence to the first PSS symbol and the mapping of the second m-sequence to the second PSS symbol, the bit information may be obtained as 1, and based on the mapping of the first m-sequence to the second PSS symbol, and the mapping of the second m-sequence to the first PSS symbol, the bit information may be obtained as 0.

For example, the first m-sequence and the second m-sequence may be generated based on a third m-sequence, and the third m-sequence may include a second sequence related to generation of a gold sequence included in the SSS symbol.

For example, the bit information obtained based on an order in which the first m-sequence and the second m-sequence are mapped to the first PSS symbol and the second PSS symbol may include information related to sidelink synchronization signal (SLSS) identifier (ID).

For example, the SL SSB may include a PSBCH, the PSBCH may include a plurality of DM-RSs, the plurality of DM-RSs may be included in each different subcarrier, each of the subcarriers may be in the same symbol, and a constant first frequency interval may exist between each of the subcarriers.

For example, the plurality of DM-RSs may be included repeatedly in the PSBCH at regular time intervals.

For example, each DM-RS repeatedly included in the PSBCH at the regular time interval may be included in a subcarrier related to a frequency which is added by a regular second frequency interval from a frequency of each of the subcarriers including each of the DM-RS before the regular time interval whenever the respective DM-RS is repeatedly included in the PSBCH.

For example, the first m-sequence may be the same as the second m-sequence.

For example, the first m-sequence may be generated based on a first cyclic shift and a second cyclic shift, and the first cyclic shift may differ from the second cyclic shift by 63 or 64.

For example, the SL SSB may include a secondary synchronization signal (SSS) symbol, and the first m-sequence may be generated using an initial value related to generation of the SSS symbol.

For example, the first m-sequence may not be identical to the second m-sequence.

For example, the first m-sequence may be generated based on a first cyclic shift and a second cyclic shift, the second m-sequence may be generated based on a third cyclic shift and a fourth cyclic shift, and the first cyclic shift, the second cyclic shift, the third cyclic shift, and the fourth cyclic shift may be different cyclic shifts selected from among four cyclic shifts that divide the length of the entire cyclic shift into quarters.

For example, the SL SSB may include a SSS symbol, and the first m-sequence and the second m-sequence may be generated using an initial value related to generation of the SSS symbol.

The above-described embodiment may be applied to various apparatuses to be described below. For example, a processor 102 of a first apparatus 100 may receive a SL SSB from a second apparatus. In addition, the processor 102 of the first apparatus 100 may obtain bit information based on the order in which a first m-sequence and a second m-sequence are mapped to a first PSS symbol and a second PSS symbol.

According to an embodiment of the present disclosure, a first apparatus for performing wireless communication may be proposed. For example, the first apparatus may comprise one or more memories storing instructions; one or more transceivers; and one or more processors connected to the one or more memories and the one or more transceivers. For example, the one or more processors may execute the instructions to: receive an SL SSB from second apparatus, wherein the SL SSB includes a first primary synchronization signal (PSS) symbol and a second PSS symbol, wherein a first m-sequence is mapped to the first PSS symbol or the second PSS symbol, and wherein a second m-sequence is mapped to a symbol to which the first m-sequence is not mapped among the first PSS symbol and the second PSS symbol; and obtain bit information based on an order in which the first m-sequence and the second m-sequence are mapped to the first PSS symbol and the second PSS symbol.

According to an embodiment of the present disclosure, an apparatus configured to control a first user equipment (UE) may be proposed. For example, the apparatus may comprise one or more processors; and one or more memories operably connectable to the one or more processors and storing instructions. For example, the one or more processors may execute the instructions to: receive an SL SSB from second UE, wherein the SL SSB includes a first primary synchronization signal (PSS) symbol and a second PSS symbol, wherein a first m-sequence is mapped to the first PSS symbol or the second PSS symbol, and wherein a second m-sequence is mapped to a symbol to which the first m-sequence is not mapped among the first PSS symbol and the second PSS symbol; and obtain bit information based on an order in which the first m-sequence and the second m-sequence are mapped to the first PSS symbol and the second PSS symbol.

According to an embodiment of the present disclosure, a non-transitory computer-readable storage medium storing instructions may be proposed. For example, when executed, the instructions may cause a first apparatus to: receive an SL SSB from second apparatus, wherein the SL SSB includes a first primary synchronization signal (PSS) symbol and a second PSS symbol, wherein a first m-sequence is mapped to the first PSS symbol or the second PSS symbol, and wherein a second m-sequence is mapped to a symbol to which the first m-sequence is not mapped among the first PSS symbol and the second PSS symbol; and obtain bit information based on an order in which the first m-sequence and the second m-sequence are mapped to the first PSS symbol and the second PSS symbol.

FIG. 21 shows a procedure in which a second apparatus transmits an SL SSB to a first apparatus, according to an embodiment of the present disclosure. The embodiment of FIG. 21 may be combined with various embodiments of the present disclosure.

Referring to FIG. 21, in step 2110, the second apparatus may transmit an SL SSB to a first apparatus. For example, the SL SSB may include a first primary synchronization signal (PSS) symbol and a second PSS symbol, a first m-sequence may be mapped to the first PSS symbol or the second PSS symbol, a second m-sequence may be mapped to a symbol to which the first m-sequence is not mapped among the first PSS symbol and the second PSS symbol, and bit information may be obtained based on an order in which the first m-sequence and the second m-sequence are mapped to the first PSS symbol and the second PSS symbol.

For example, the bit information obtained based on an order in which the first m-sequence and the second m-sequence are mapped to the first PSS symbol and the second PSS symbol may include information related to sidelink synchronization signal (SLSS) identifier (ID).

The above-described embodiment may be applied to various apparatuses to be described below. For example, the processor 202 of the second apparatus 200 may control the transceiver 206 to transmit a sidelink (SL) synchronization signal block (SSB) to the first apparatus 100.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: transmit an SL SSB to a first apparatus, wherein the SL SSB may include a first primary synchronization signal (PSS) symbol and a second PSS symbol, wherein a first m-sequence may be mapped to the first PSS symbol or the second PSS symbol, wherein a second m-sequence may be mapped to a symbol to which the first m-sequence is not mapped among the first PSS symbol and the second PSS symbol, and wherein bit information may be obtained based on an order in which the first m-sequence and the second m-sequence are mapped to the first PSS symbol and the second PSS symbol.

For example, the bit information obtained based on an order in which the first m-sequence and the second m-sequence are mapped to the first PSS symbol and the second PSS symbol may include information related to sidelink synchronization signal (SLSS) identifier (ID).

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
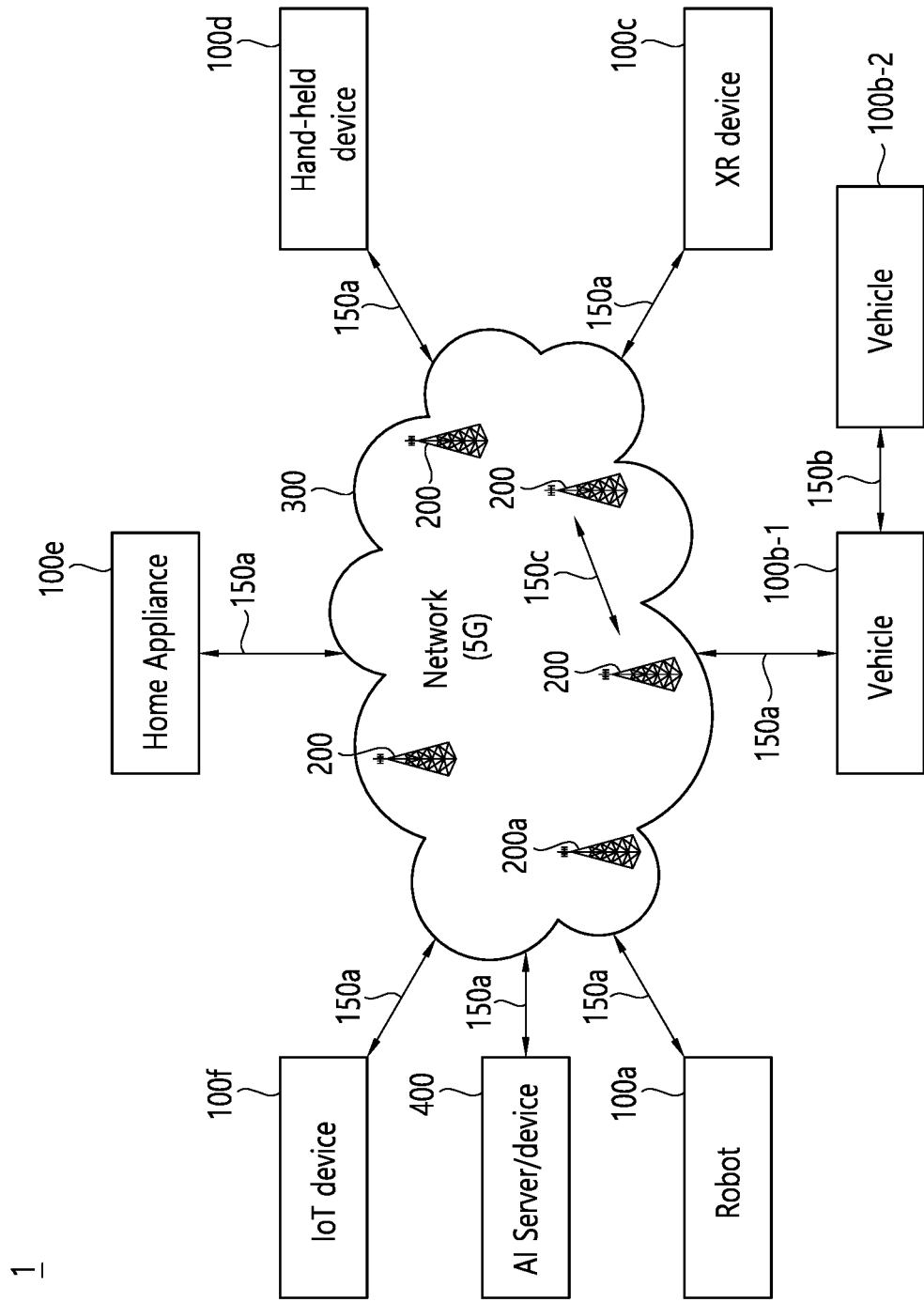
FIG. 22 shows a communication system 1, in accordance with an embodiment of the present disclosure.

FIG. 22 shows a communication system 1, in accordance with an embodiment of the present disclosure.

Referring to FIG. 22, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
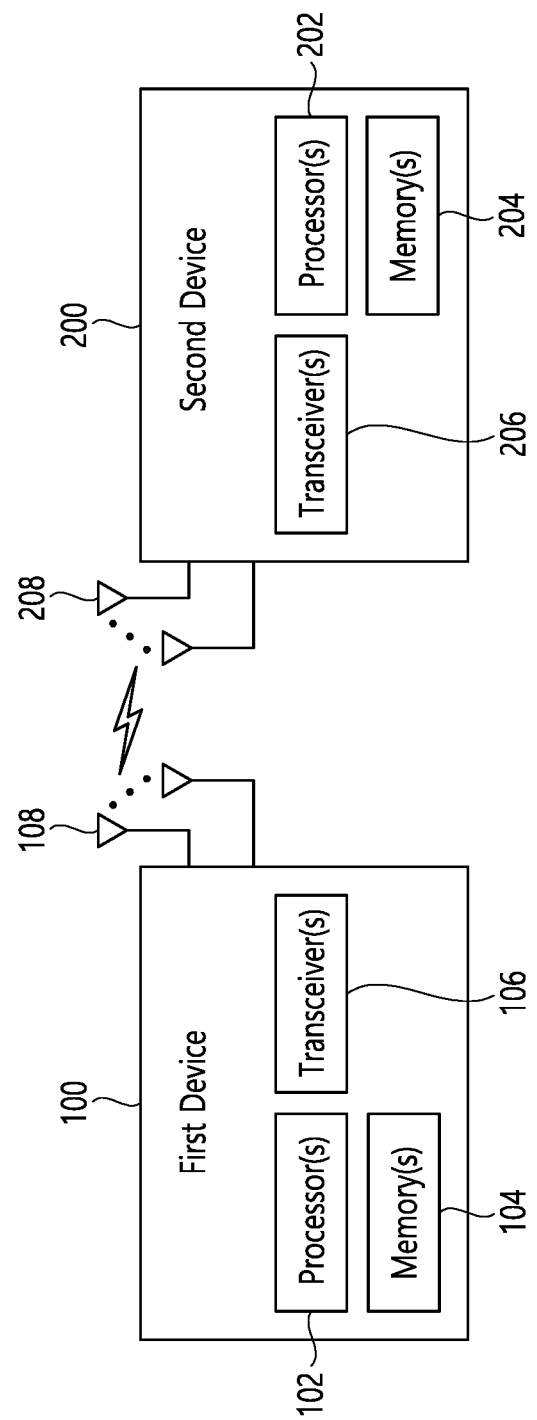
FIG. 23 shows wireless devices, in accordance with an embodiment of the present disclosure.

FIG. 23 shows wireless devices, in accordance with an embodiment of the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 24:
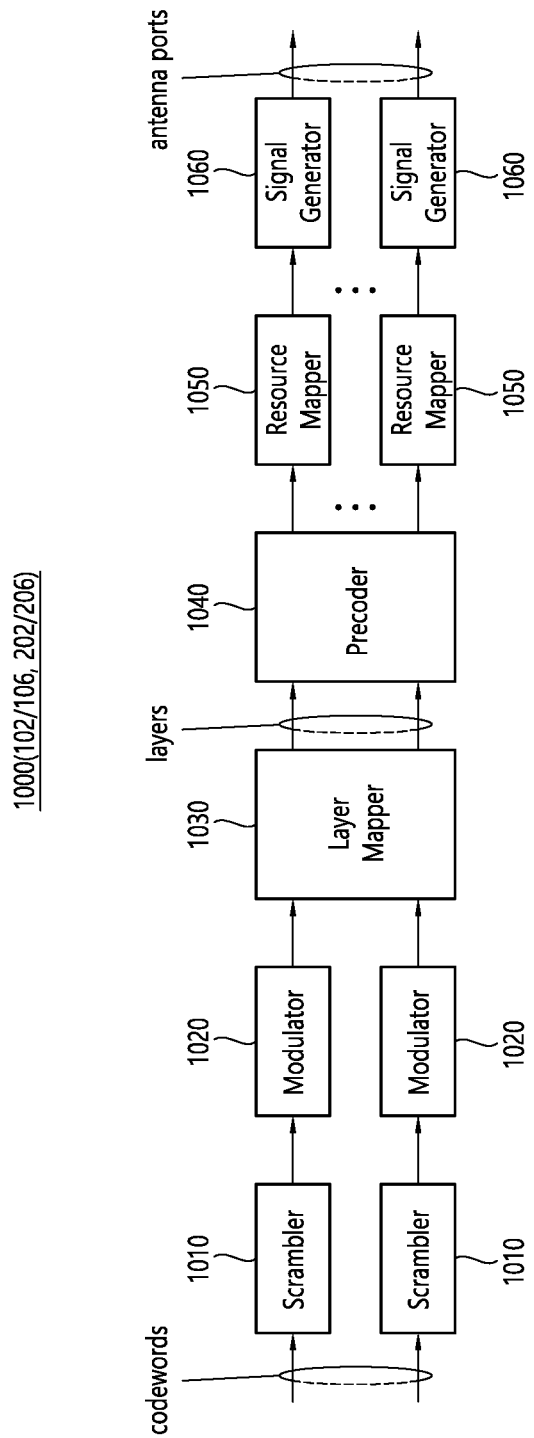
FIG. 24 shows a signal process circuit for a transmission signal, in accordance with an embodiment of the present disclosure.

FIG. 24 shows a signal process circuit for a transmission signal, in accordance with an embodiment of the present disclosure.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
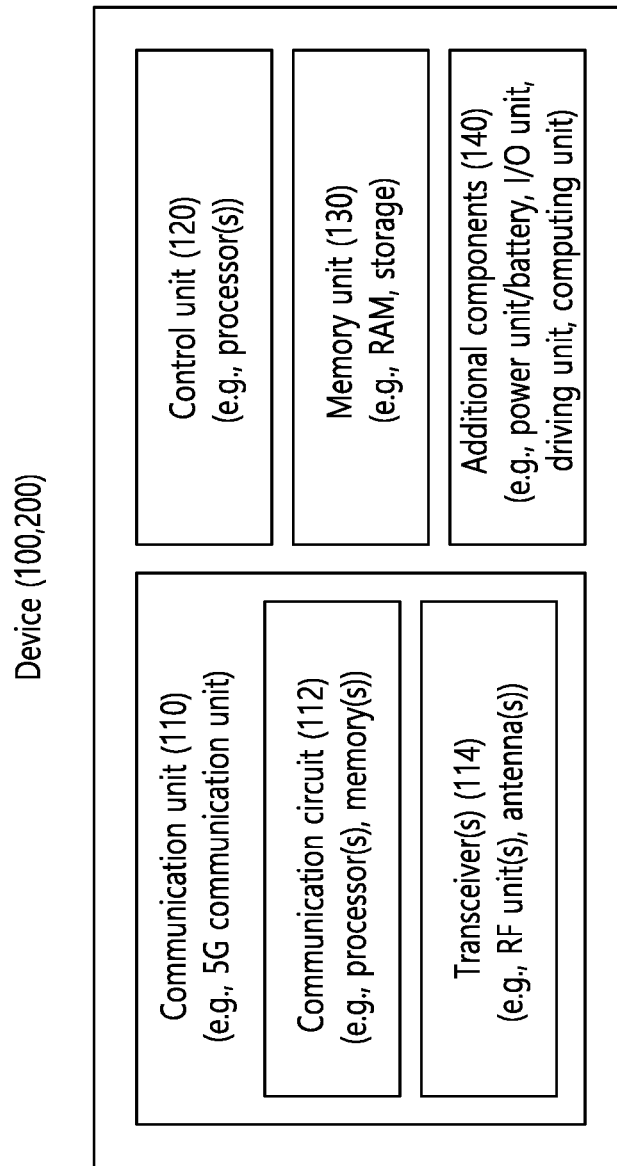
FIG. 25 shows another example of a wireless device, in accordance with an embodiment of the present disclosure.

FIG. 25 shows another example of a wireless device, in accordance with an embodiment of the present disclosure. The wireless device may be implemented in various forms according to a use-case/service (refer to FIG. 22).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
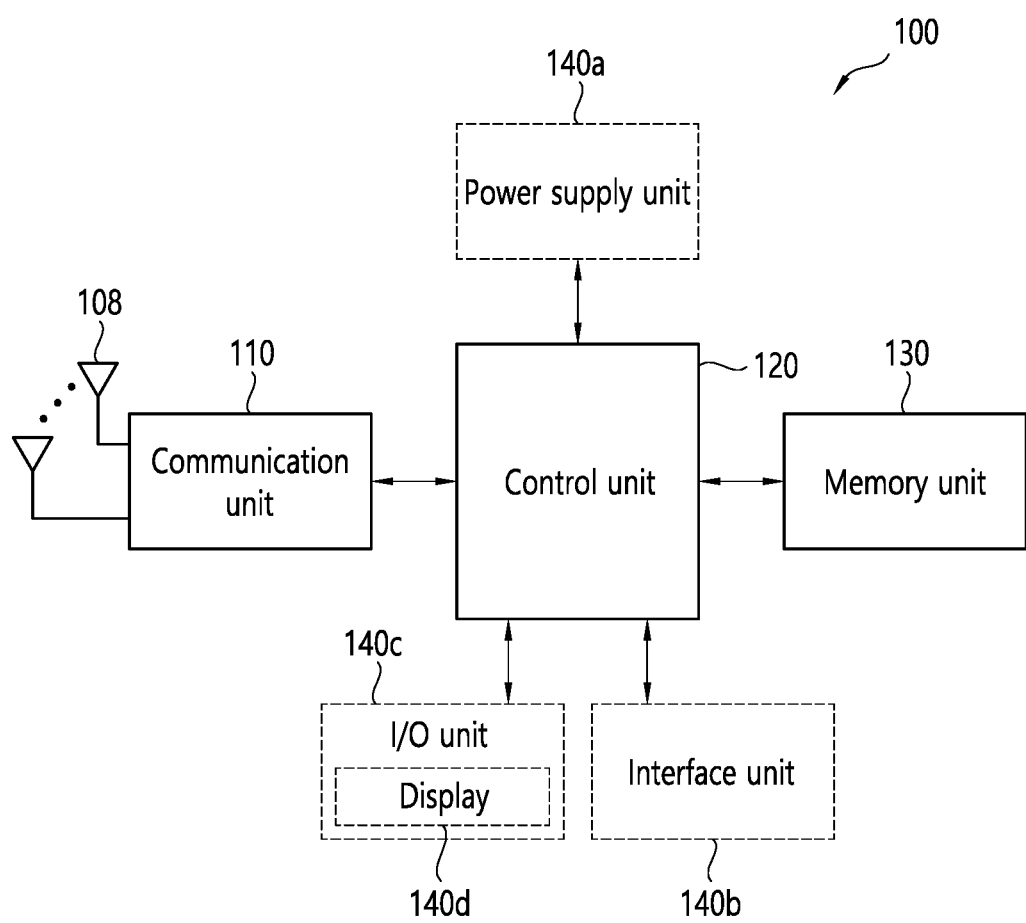
FIG. 26 shows a hand-held device, in accordance with an embodiment of the present disclosure.

FIG. 26 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
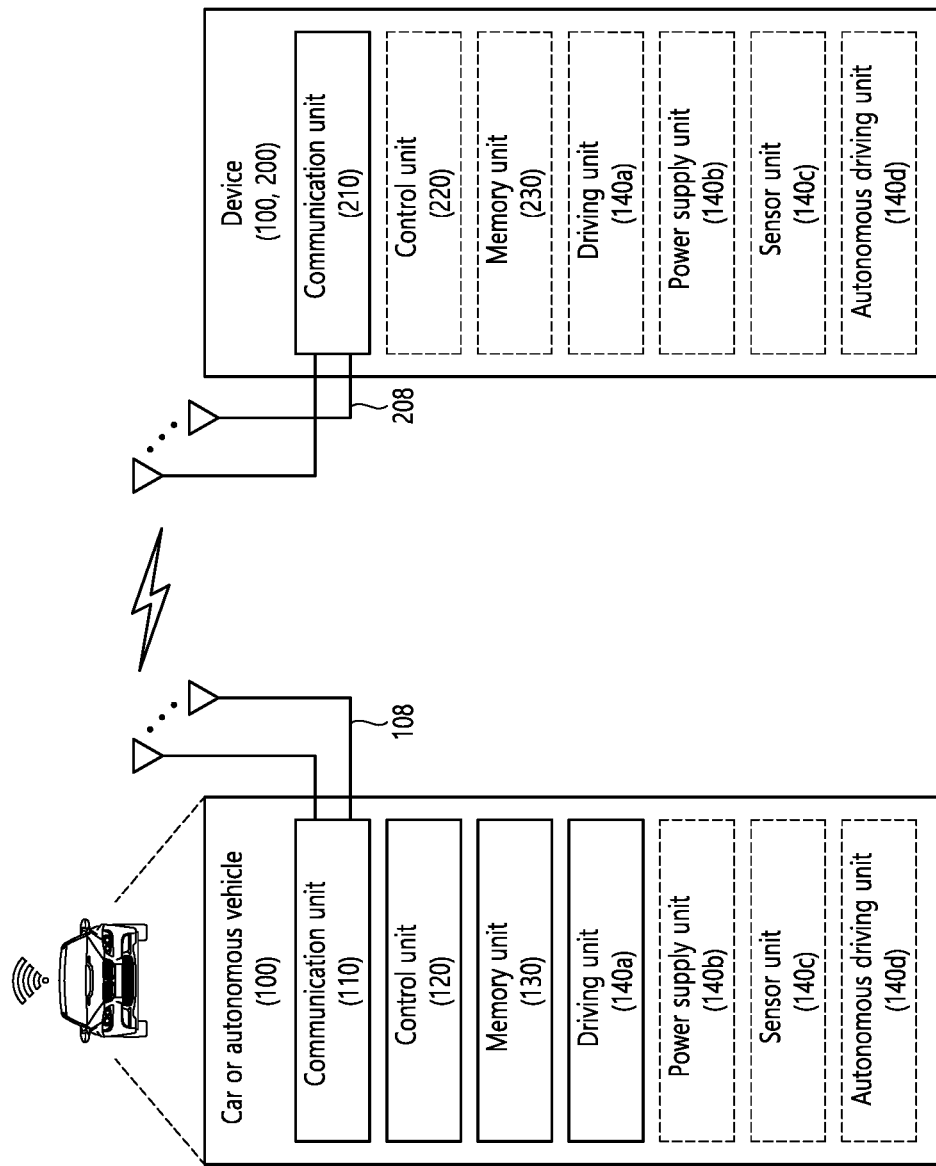
FIG. 27 shows a vehicle or an autonomous vehicle, in accordance with an embodiment of the present disclosure.

FIG. 27 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 27, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for receiving, by a first apparatus, a sidelink (SL) synchronization signal block (SSB), the method comprising:
    receiving an SL SSB from second apparatus,
    wherein the SL SSB includes a first primary synchronization signal (PSS) symbol and a second PSS symbol,
    wherein a first m-sequence is mapped to the first PSS symbol or the second PSS symbol, and
    wherein a second m-sequence is mapped to a symbol to which the first m-sequence is not mapped among the first PSS symbol and the second PSS symbol; and
    obtaining bit information based on an order in which the first m-sequence and the second m-sequence are mapped to the first PSS symbol and the second PSS symbol.

2. The method of claim 1, wherein based on the mapping of the first m-sequence to the first PSS symbol and the mapping of the second m-sequence to the second PSS symbol, the bit information is obtained as 1, and
    wherein based on the mapping of the first m-sequence to the second PSS symbol, and the mapping of the second m-sequence to the first PSS symbol, the bit information is obtained as 0.

3. The method of claim 1, wherein the first m-sequence and the second m-sequence are generated based on a third m-sequence, and
    wherein the third m-sequence includes a second sequence related to generation of a gold sequence included in the SSS symbol.

4. The method of claim 1, wherein the bit information obtained based on an order in which the first m-sequence and the second m-sequence are mapped to the first PSS symbol and the second PSS symbol includes information related to sidelink synchronization signal (SLSS) identifier (ID).

5. The method of claim 1, wherein the SL SSB includes a PSBCH,
    wherein the PSBCH includes a plurality of DM-RSs,
    wherein the plurality of DM-RSs are included in each different subcarrier,
    wherein each of the subcarriers is in the same symbol, and
    wherein a constant first frequency interval exists between each of the subcarriers.

6. The method of claim 5, wherein the plurality of DM-RSs are included repeatedly in the PSBCH at regular time intervals.

7. The method of claim 6, wherein each DM-RS repeatedly included in the PSBCH at the regular time interval is included in a subcarrier related to a frequency which is added by a regular second frequency interval from a frequency of each of the subcarriers including each of the DM-RS before the regular time interval whenever the respective DM-RS is repeatedly included in the PSBCH.

8. The method of claim 1, wherein the first m-sequence is the same as the second m-sequence.

9. The method of claim 8, wherein the first m-sequence is generated based on a first cyclic shift and a second cyclic shift, and
    wherein the first cyclic shift differs from the second cyclic shift by 63 or 64.

10. The method of claim 9, wherein the SL SSB includes a secondary synchronization signal (SSS) symbol, and
    wherein the first m-sequence is generated using an initial value related to generation of the SSS symbol.

11. The method of claim 1, wherein the first m-sequence is not identical to the second m-sequence.

12. The method of claim 11, wherein the first m-sequence is generated based on a first cyclic shift and a second cyclic shift,
    wherein the second m-sequence is generated based on a third cyclic shift and a fourth cyclic shift, and
    wherein the first cyclic shift, the second cyclic shift, the third cyclic shift, and the fourth cyclic shift are different cyclic shifts selected from among four cyclic shifts that divide the length of the entire cyclic shift into quarters.

13. The method of claim 12, wherein the SL SSB includes a SSS symbol, and
    wherein the first m-sequence and the second m-sequence are generated using an initial value related to generation of the SSS symbol.

14. A first apparatus for performing wireless communication, the first apparatus comprising:
    one or more memories storing instructions;
    one or more transceivers; and
    one or more processors connected to the one or more memories and the one or more transceivers, wherein the one or more processors execute the instructions to:
    receive an SL SSB from second apparatus,
    wherein the SL SSB includes a first primary synchronization signal (PSS) symbol and a second PSS symbol,
    wherein a first m-sequence is mapped to the first PSS symbol or the second PSS symbol, and
    wherein a second m-sequence is mapped to a symbol to which the first m-sequence is not mapped among the first PSS symbol and the second PSS symbol; and
    obtain bit information based on an order in which the first m-sequence and the second m-sequence are mapped to the first PSS symbol and the second PSS symbol.

15. An apparatus configured to control a first user equipment (UE), the apparatus comprising:
    one or more processors; and
    one or more memories operably connectable to the one or more processors and storing instructions, wherein the one or more processors execute the instructions to:
    receive an SL SSB from second UE,
    wherein the SL SSB includes a first primary synchronization signal (PSS) symbol and a second PSS symbol,
    wherein a first m-sequence is mapped to the first PSS symbol or the second PSS symbol, and wherein a second m-sequence is mapped to a symbol to which the first m-sequence is not mapped among the first PSS symbol and the second PSS symbol; and obtain bit information based on an order in which the first m-sequence and the second m-sequence are mapped to the first PSS symbol and the second PSS symbol.

\* \* \* \* \*